(12) United States Patent
Da Silva et al.

(10) Patent No.: US 11,051,191 B2
(45) Date of Patent: Jun. 29, 2021

(54) WIRELESS DEVICE, RADIO NETWORK NODE, AND METHODS PERFORMED THEREIN FOR HANDLING COMMUNICATION IN A WIRELESS COMMUNICATION NETWORK

(71) Applicant: TELEFONAKTIEBOLAGET LM ERICSSON (PUBL), Stockholm (SE)

(72) Inventors: Icaro L. J. Da Silva, Solna (SE); Sebastian Euler, Storvreta (SE)

(73) Assignee: Telefonaktiebolaget Ericsson LM (publ), Stockholm (SE)

( * ) Notice: Subject to any disclaimer, the term of this patent is extended or adjusted under 35 U.S.C. 154(b) by 16 days.

(21) Appl. No.: 16/606,913

(22) PCT Filed: May 3, 2018

(86) PCT No.: PCT/SE2018/050456
§ 371 (c)(1),
(2) Date: Oct. 21, 2019

(87) PCT Pub. No.: WO2018/203815
PCT Pub. Date: Nov. 8, 2018

(65) Prior Publication Data
US 2020/0196173 A1    Jun. 18, 2020

Related U.S. Application Data

(60) Provisional application No. 62/501,144, filed on May 4, 2017.

(51) Int. Cl.
*H04W 24/08* (2009.01)
*H04B 7/06* (2006.01)
*H04W 24/10* (2009.01)

(52) U.S. Cl.
CPC ......... *H04W 24/08* (2013.01); *H04B 7/0617* (2013.01); *H04B 7/0695* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 2017/0324459 A1* | 11/2017 | Koskela | ............... | H04B 7/0617 |
| 2018/0007577 A1* | 1/2018 | Guo | ..................... | H04W 16/28 |
| 2018/0199328 A1* | 7/2018 | Sang | ..................... | H04B 7/022 |

FOREIGN PATENT DOCUMENTS

GB    2559424 A    8/2013

OTHER PUBLICATIONS

3GPP TSG RAN WG2#97, R2-1701731, "Measurement reporting for beam management", Intel Corporation, Athens, Greece, Feb. 13-17, 2017.

(Continued)

*Primary Examiner* — Brian S Roberts
(74) *Attorney, Agent, or Firm* — Ericsson Inc.

(57) ABSTRACT

Embodiments herein relate e.g. to a method performed a wireless device (10) for handling communication of the wireless device (10) in a wireless communication network (1). A radio network node (12) serves the wireless device (10). The wireless device obtains a first indication indicating a first number of beams for performing cell quality derivation on and a second indication indicating a second number of beams for performing measurement reporting on. The wireless device performs a cell quality derivation taking the first indication into account; and performs measurement reporting of a second number of beams taking the second indication into account.

18 Claims, 22 Drawing Sheets

(56) References Cited

OTHER PUBLICATIONS

3GPP TSG-RAN WG2 Meeting #97bis, R2-1702921, "Cell quality deriving, beam measurement reporting and filtering in NR", CMCC, R2-1702921, Spokane, USA, Apr. 3-7, 2017.
3GPP TSG-RAN WG2 Meeting #97bis, R2-1703163, "Mobility Measurements in Connected Mode", Nokia, Alcatel-Lucent Shanghai Bell, Spokane, USA, Apr. 3-7, 2017 (3 pages).
3GPP TSG-RAN WG2 Meeting #97bis, R2-1703597, "NR RRM measurement modelling", LG Electronics Inc., Spokane, USA, Apr. 3-7, 2017 (2 pages).
Asustek: "Consideration on measurement reporting for NR mobility", 3GPP Draft; R2-1701446 Consideration on Measurement Reporting for NR Mobility, 3rd Generation Partnership Project (3GPP), Mobile Competence Centre ; Feb. 12, 2017 (Feb. 12, 2017).
Sony: "Cell quality measurement evaluation using multiple beams (Was R2-1700141)", 3GPP Draft; R2-1701504 NR Cell Quality Beams, 3rd Generation Partnership Project (3GPP), Mobile Competence Centre ; 650, Route Des Lucioles ; F-06921 Sophia-Antipolis Cedex ; France, vol. RAN WG2, No. Athens, Greece; Feb. 13, 2017—Feb. 12, 2017.
Ericsson: "Measurement model and cell quality derivation in NR", 3GPP Draft; R2-1702796—Measurement Model and Cell Quality Derivation in NR, 3rd Generation Partnership Project (3GPP), Mobile Competence Centre ; 650, Route Des Lucioles ; F-06921 Sophia-Antipolis C , vol. RAN WG2, No. Spokane, USA; Apr. 3, 2017.
3GPP_TS_36.300_V14.0.0.
Report of 3GPP TSG RAN WG2 meeting #97, Athens, Greece, Feb. 13-17, 2017.
Report of 3GPP TSG RAN WG2 meeting #97bis, Spokane, USA, Apr. 3-7, 2017.
PCT Publication WO2018/203815 for PCTSE2018050456.

* cited by examiner

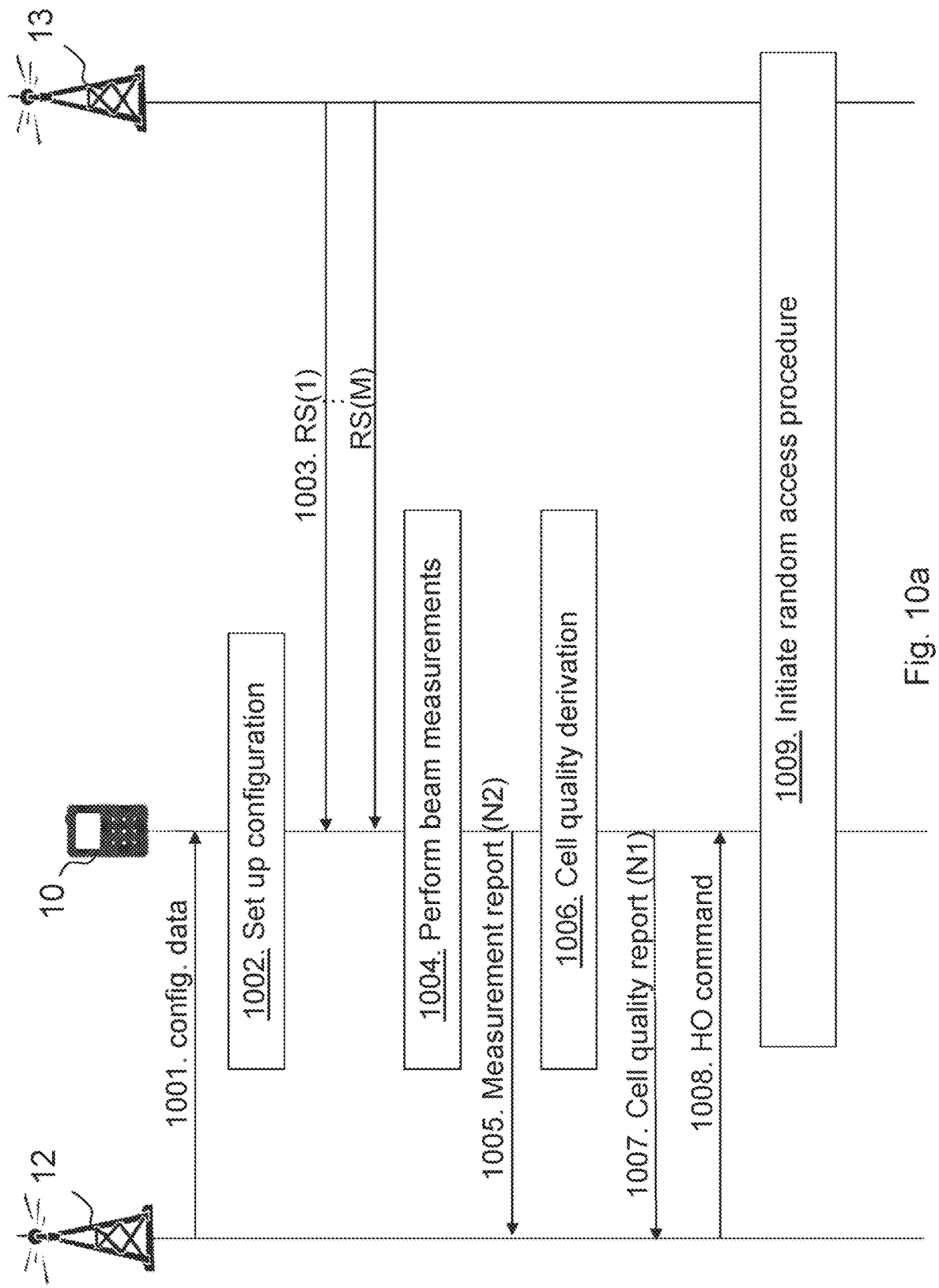

WIRELESS DEVICE, RADIO NETWORK NODE, AND METHODS PERFORMED THEREIN FOR HANDLING COMMUNICATION IN A WIRELESS COMMUNICATION NETWORK

TECHNICAL FIELD

Embodiments herein relate to a wireless device, a radio network node and methods performed therein regarding wireless communication. Furthermore, a computer program product and a computer-readable storage medium are also provided herein. In particular, embodiments herein relate to handling communication of, or handling beams at, the wireless device in a wireless communication network.

BACKGROUND

In a typical wireless communication network, wireless devices, also known as wireless communication devices, mobile stations, stations (STA) and/or user equipments (UE), communicate via a Radio access Network (RAN) with one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a NodeB, an eNodeB, or a gNodeB. The service area or cell area is a geographical area where radio coverage is provided by the radio network node. The radio network node operates on radio frequencies to communicate over an air interface with the wireless devices within range of the radio network node. The radio network node communicates over a downlink (DL) to the wireless device and the wireless device communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3$^{rd}$ 3GPP and this work continues in the coming 3GPP releases, such as 4G and 5G networks such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies, the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Scheduled reference signals, called channel-state information reference signals (CSI-RS), are transmitted when needed for a particular connection. Channel-state information (CSI) comprises Channel Quality Indicator (CQI), Precoding Matrix Indicator (PMI), and Rank Indicator (RI). The CQI is reported by the wireless device to the radio network node. The wireless device indicates modulation scheme and coding scheme to the radio network node. To predict the downlink channel condition, CQI feedback by the wireless device may be used as an input. CQI reporting can be based on PMI and RI. PMI is indicated by the wireless device to the radio network node, which precoding matrix may be used for downlink transmission which is determined by RI. The wireless device further indicates the RI to the radio network node, i.e. RI indicates the number of layers that should be used for downlink transmission to the wireless device. The decision when and how to transmit the CSI-RS is made by the radio network node and the decision is signalled to the involved wireless devices using a so-called measurement grant. When the wireless device receives a measurement grant it measures on a corresponding CSI-RS. The radio network node may choose to transmit CSI-RSs to a wireless device only using beam(s) that are known to be strong for that wireless device, to allow the wireless device to report more detailed information about those beams. Alternatively, the radio network node may choose to transmit CSI-RSs also using beam(s) that are not known to be strong for that wireless device, for instance to enable fast detection of new beam(s) in case the wireless device is moving.

The radio network nodes of a New Radio (NR) network transmit other reference signals as well. For instance, the radio network nodes may transmit so-called demodulation reference signals (DMRS) when transmitting control information or data to a wireless device. Such transmissions are typically made using beam(s) that are known to be strong for that wireless device.

For NR, frequency ranges up to 100 GHz are considered. It is known that high-frequency radio communication above 6 GHz suffers from significant path loss and penetration loss. One solution to address this issue is to deploy large-scale antenna arrays to achieve high beamforming gain, which is a reasonable solution due to the small wavelength of high-frequency signal. Therefore MIMO schemes for NR are also called massive MIMO. For around 30-70 GHz, up to 256 Transmission (Tx) and Reception (Rx) antenna elements are assumed. Extension to support 1024Tx antenna elements at 70 GHz is agreed and this is under discussion for 30 GHz. For sub-6 GHz communication, to obtain more beamforming and multiplexing gain by increasing the number of antenna elements is also a trend.

With massive MIMO, three approaches for beamforming have been discussed: analogue, digital, and hybrid (a combination of the analogue and the digital). The analogue beamforming would compensate high pathloss in NR scenarios, while digital beamforming (or precoding) would provide additional performance gains similar to MIMO for sub-6 GHz necessary to achieve a reasonable coverage. The implementation complexity of analogue beamforming is significantly less than digital beamforming, since it relies on simple phase shifters, but the drawbacks are its limitation in multi-direction flexibility, i.e. only a single beam can be formed at a time and the beams are then switched in time domain, only wideband transmissions, i.e. not possible to transmit over a subband, unavoidable inaccuracies in the analogue domain, etc. Digital beamforming, requiring costly converters to and from the digital domain from and to Intermediate Frequency (IF) domain, used today in LTE, provides the best performance in terms of data rate and multiplexing capabilities since multiple beams over multiple subbands at a time can be formed, but at the same time it is challenging in terms of power consumption, integration, and cost; in addition to that the gains do not scale linearly with the number of transmit and receive units while the cost is growing rapidly. Supporting hybrid beamforming, to benefit from cost-efficient analogue beamforming and high-capacity digital beamforming, is therefore desirable for NR. An example diagram for hybrid beamforming is shown in FIG. 1 using digital precoding and analogue beamforming.

Beamforming can be on transmission beams and/or reception beams, network side or wireless device side.

The analogue beam of a subarray can be steered toward a single direction on each Orthogonal Frequency Division Multiplexing (OFDM) symbol, and hence the number of subarrays determines the number of beam directions and the corresponding coverage on each OFDM symbol. However, the number of beams to cover the whole serving area is typically larger than the number of subarrays, especially when the individual beam-width is narrow. Therefore, to cover the whole serving area, multiple transmissions with narrow beams differently steered in time domain are also likely to be needed. The provision of multiple narrow coverage beams for this purpose is also called "beam sweeping". For analogue and hybrid beamforming, the beam sweeping seems to be essential to provide the basic coverage in NR. For this purpose, multiple OFDM symbols, in which differently steered beams can be transmitted through subarrays, can be assigned and periodically transmitted. FIG. 2 shows a Tx beam sweeping on 2 subarrays. FIG. 3 shows a Tx beam sweeping on 3 subarrays.

Herein we describe a non-limiting example of Synchronization Signal (SS) block and SS burst configuration which may be assumed herein.

SS block: NR-Primary Synchronization Signal (PSS), NR-Secondary Synchronization Signal (SSS) and/or NR-Physical Broadcast Channel (PBCH) can be transmitted within an SS block. For a given frequency band, an SS block corresponds to N OFDM symbols based on the default subcarrier spacing, and N is a constant. Wireless device may be able to identify at least OFDM symbol index, slot index in a radio frame and radio frame number from an SS block. A single set of possible SS block time locations, e.g., with respect to radio frame or with respect to SS burst set, is specified per frequency band. At least for multi-beams case, at least the time index of SS-block is indicated to the wireless device. The position(s) of actual transmitted SS-blocks can be informed for helping CONNECTED and/or IDLE mode measurement, for helping CONNECTED mode wireless device to receive DL data and/or control in unused SS-blocks and potentially for helping IDLE mode wireless device to receive DL data/control in unused SS-blocks.

SS burst: One or multiple SS block(s) compose an SS burst. The maximum number of SS-blocks, L, within a SS burst set may be carrier frequency dependent, e.g.:

For frequency range category #A (e.g., 0~6 GHz), the number (L) is To be decided (TBD) within $L \leq [16]$ For frequency range category #B (e.g., 6~60 GHz), the number is TBD within $L \leq [128]$ SS burst set: One or multiple SS burst(s) further compose an SS burst set (or series) where the number of SS bursts within a SS burst set is finite. From physical layer specification perspective, at least one periodicity of SS burst set is supported. From wireless device perspective, SS burst set transmission is periodic. At least for initial cell selection, the wireless device may assume a default periodicity of SS burst set transmission for a given carrier frequency (e.g., one of 5 ms, 10 ms, 20 ms, 40 ms, 80 ms, or 160 ms). The wireless device may assume that a given SS block is repeated with a SS burst set periodicity. By default, the wireless device may neither assume that radio base station gNB transmits the same number of physical beam(s), nor transmits the same physical beam(s) across different SS-blocks within an SS burst set.

For each carrier, the SS blocks may be time-aligned or overlap fully or at least in part, or the beginning of the SS blocks may be time-aligned, e.g., when the actual number of transmitted SS blocks is different in different cells. FIG. 4 shows an example configuration of SS blocks, SS bursts and SS burst sets/series.

In LTE handover decisions at a serving radio base station, also referred to as an eNB in LTE, are taken based on events configured at the wireless device based on the radio quality of different cells. These measurements are performed based on cell-specific reference signals so that a cell quality is derived, also called cell quality derivation.

In LTE the wireless device uses cell-specific reference signals (CRS) and synchronization signals, e.g. PSS/SSS, to discover a cell and perform Radio Resource Management (RRM) measurements to derive a cell quality. For both intra- and inter-frequency measurements, i.e. measurements within frequencies and between different frequencies, the wireless device is expected to fulfill certain RRM requirements depending on channel conditions and noise levels. To do that wireless device typically collects periodic snapshots, e.g. at every 40 ms, based on CRS (after cell detection) where coherent and non-coherent averages are performed per sample in a limited bandwidth. The wireless device performs filtering at the physical layer, to e.g. eliminate spikes or erroneous measurements, before reporting the measurement results to higher layers. Every time a measurement result is received by the higher layers, wireless device performs Layer 3 (L3) filtering. In LTE the standardized L3 filtering provides some level of harmonization among wireless devices. However, the parameters of the Layer one (L1) filtering are not standardized and left to wireless device implementation. Thus, L3 filter is configured by L3. L1 filter is usually not configurable, and left to wireless device implementation i.e. not specified.

The LTE filtering model, as captured in TS 36.300 section 10.6 version 14.0.0, is reproduced in FIG. 5, wherein letters A, B, C, C' and D are entry points.

In 3GPP, RAN1 terminology assumed that at least the combination of NR synchronization sequences, e.g. NR-PSS/NR-SSS, and PBCH constitutes a so called SS Block. That may also contain a Tertiary or Time Synchronization Signal (TSS) Sequence to indicate the OFDM symbol timing or equivalent information, but this is still for further study (FFS) in RAN1. An alternative to this TSS is a time index encoded as part of the PBCH, also transmitted in each SS Block. An connected or RRC_CONNECTED wireless device trying to access a target cell may assume that the SS Block may be transmitted in the form of repetitive bursts of SS Block transmissions, denoted "SS Burst", wherein such a SS burst consists of a number of SS Block transmissions following close after each other in time. Furthermore, a set of SS Bursts may be grouped together (denoted "SS Burst Set"), where the SS Bursts in the SS Burst Sets are assumed to have some relation to each other. Both SS Bursts and SS Burst Sets have their respective given periodicity. In the single beam scenarios, the network could configure time-repetition within one SS Burst in a wide beam.

FIG. 6 shows examples of different configurations of an SS Burst Set. Top: Time-repetition within one SS Burst in a wide beam. Middle: Beam-sweeping of a small number of beams using only one SS Burst in the SS Burst Set. Bottom: Beam-sweeping of a larger number of beams using more than one SS Burst in the SS Burst Set to form a complete sweep. Which of these three alternatives to implement is a network vendor choice. That choice depends on the tradeoff between i) the overhead caused by transmitting periodic and always on narrow beam sweepings vs. ii) the delays and signaling needed to configure the wireless device to find a narrow beam for Physical Downlink Shared Channel (PDSCH)/Physical Downlink Control Channel (PDCCH). The implementation shown in the upper figure prioritizes i), while the implementation shown in the bottom figure prioritizes ii). The figure in the middle case is an intermediate case, where a sweeping of wide beams is used. In that case the number of beams to cover the cell is reduced, but in some cases an additional refinement is needed for narrow gain beamforming of PDSCH.

Regardless of which of these is implemented in each cell, the wireless device should be able to perform cell based measurements when SS Block signals are being beamformed. According to the RAN2 agreements from RAN2 #97 meeting in Athens, cell quality derivation, or cell quality can be derived from multiple beams and the following has been agreed:

Agreement
1 Cell quality can be derived from N best beams where value of N can be configured to 1 or more than 1.
FFS: Details of filtering to be applied.
FFS: How the quality of the serving cell is determined (e.g. from serving beam only or cell quality).
FFS: Whether the agreement applies to both additional RS and idle RS.
FFS: Whether to only consider beams above a threshold aka 'good' beams.

In RAN2 #97-bis discussions, further progress has been reached and the following has been agreed:
Agreements
1 The Radio resource control (RRC) configured beam consolidation and selection of beam quality of radio network node detected beams to derive a cell quality shall be performed after the L1 filter.
2 The L1 filter filters signal quality corresponding to radio network node beams detected by the wireless device.
3: The measurement model (applicable for both multi beam and single beam case) in NR shall consist of the following:
a—L1 filtering of beam measurements
FFS Whether there is any additional specified filtering of the beam measurements
b—Derivation of cell quality from one or more radio network node beam quality
c—L3 filter (RRC configured) of cell quality
d—Evaluation reporting criteria (RRC configured)

That can be translated in one of the two measurement models, depending whether 3GPP will decide or not for a L3 (or L2) standardized filtering method for beam quality measurements. FIG. 7a shows a possible measurement model with L3/L2 standardized (i.e. configurable) filters per beam measurement. In FIG. 7a there is an additional specified filtering of the beam measurements whose parameter can be configured by RRC (or Medium Access Control (MAC) layer). Notice that the filter parameters do not have to be the same as for the L3 filter per cell value. In FIG. 7b, there is no additional specified filtering of the beam measurements whose parameters can be configured by RRC (or MAC layer). Thus, FIG. 7b shows a possible measurement model without any L3/L2 standardized, i.e. configurable, filters per beam measurement. Notice that in both the models of FIGS. 7a and 7b there is a Cell Quality Derivation function (which contains a beam consolidation function that selects out of the detected beams the N best beams). Regarding that, the following has also been agreed in RAN2 #97-bis discussions:

Agreements
1 Averaging is used to derive the cell quality from multiple beams (if number of beams is larger than 1). Details for the averaging are FFS.
Agreement
1 Serving cell quality is derived in the same way as neighbour cell quality i.e. N best beams.
FFS whether a wireless device can be configured with a different values of N for the serving cell, and for specific neighbour cells.

In order to compute the cell quality also denoted as cell quality derivation, the wireless device should be configured with at least two parameters: i) the parameter N so it can consider the best N beams to perform that averaging and ii) an absolute and/or relative threshold (relative to the quality of the best beam). One of the arguments used for having N>1 was that this could reduce the number of handover ping-pongs i.e. a handover performed from the serving cell to a target cell followed immediately, i.e. in a very short time e.g. within a time interval, of another handover(s). Averaging N instead of using the best beam, i.e. N=1, would simply postpone the reception at the network of measurement reports to be triggered since the average will always be worse than the value of the best beam, N=1. FIG. 8 shows an illustration of this situation. Although this could potentially reduce ping-pongs, this could also lead to handover failures and/or radio link failure since the network will only have measurement available when the average of N beams becomes good enough, by which time the quality of the serving cell might have deteriorated. FIG. 8 shows a timing of measurement reports triggered in case of using best beam and averaging for determining neighbor cell quality.

Another problem that may occur is if the wireless device performs average of its serving cell A, based on N>1 (e.g. N=4), although the wireless device is anyway served by a single beam (i.e. the best) and it measures a neighbour cell from which the wireless device can detect a single beam only. In that case, the serving cell quality will be worse than the neighbour cell quality (due to the averaging of the serving cell and due to the fact only a single beam was detected in the neighbour) which may trigger measurement reports. In that case, it is obvious that the wireless device should remain in the serving cell, not only because it has more stable beams but also because its best beam is better than the best beam of the reported neighbour cell. Hence, the network will be required to obtain additional information.

It has been proposed in RAN2 #97-bis to use relative and/or absolute thresholds from best beam to select N best beams to compute cell quality. The problem with the currently proposed approach is that it relies on some kind of average across beams when N>1 is configured. And, there could anyway be handover ping-pongs since the network has no means to distinguish the following two cases:

Case 1: Cell quality is configured to be computed based on N>1, but only a single beam is considered by the wireless device (because other N−1 beams are worse than the best beam by the relative threshold or worse than absolute threshold) for reported neighbour cells.

Case 2: Cell quality is configured to be computed based on N>1, and multiple beams are considered for reported neighbour cells.

If the network tells the wireless device to handover to a cell with very few (e.g. only one) good beams, and this single beam deteriorates shortly thereafter, the wireless device will need to do another handover and a ping-pong will occur. At least at similar cell quality, neighbour cells with more good beams should therefore be preferred to cells with less (or only one) good beams. However, since the network cannot distinguish the two cases described above, the network cannot prioritize cells with more good beams over cells with less good beams.

Another problem that may occur is the fact that the wireless device may be configured with a value of N>1 and, for certain cells, the wireless device only detects one beam and/or a number of beams lower than N. Hence, this is yet another reason the network may want to use N=1 to compute the cell quality. Performing failed handovers or ping pong handovers reduces or limits the performance of the wireless communication network.

SUMMARY

An object of embodiments herein is to provide a mechanism that improves the performance of the wireless communication network when using beamforming in a wireless communication network.

In order to solve the previously described problem a method is disclosed to decouple the triggering of measurement reports based on cell quality derivation from the beam level information to be reported to the radio network node in measurement report, so the radio network node is able to apply a proper optimization between handover ping-pong, handover failures or radio link failures.

According to an aspect the object is achieved by providing a method performed a wireless device for handling communication of the wireless device in a wireless communication network. A radio network node serves the wireless device. The wireless device obtains a first indication indicating a first number of beams for performing cell quality derivation on and a second indication indicating a second number of beams for performing measurement reporting on. The wireless device further performs a cell quality derivation taking the first indication into account; and performs measurement reporting of the second number of beams taking the second indication into account.

According to another aspect the object is achieved by providing a method performed a radio network node for handling communication of a wireless device in a wireless communication network. The first radio network node serves the wireless device, and transmits configuration data to the wireless device. The configuration data comprises a first indication indicating a first number of beams for performing cell quality derivation on and a second indication indicating a second number of beams for performing measurement reporting on.

It is herein also provided a computer program product comprising instructions, which, when executed on at least one processor, causes the at least one processor to carry out the methods herein, as performed by the first radio network node or the wireless device. Furthermore, it is herein provided a computer-readable storage medium, having stored thereon a computer program product comprising instructions which, when executed on at least one processor, cause the at least one processor to carry out the methods herein, as performed by the first radio network node or the wireless device.

According to still another aspect the object may be achieved by providing a wireless device for handling communication of the wireless device in a wireless communication network. A radio network node is configured to serve the wireless device, and configured to obtain a first indication indicating a first number of beams for performing cell quality derivation on and a second indication indicating a second number of beams for performing measurement reporting on. The radio network node is further configured to perform a cell quality derivation taking the first indication into account; and to perform a measurement reporting of the second number of beams taking the second indication into account.

According to yet another aspect the object may be achieved by providing a radio network node for handling communication of a wireless device in a wireless communication network. The radio network node is configured to serve the wireless device, and to transmit configuration data to the wireless device, wherein the configuration data comprises a first indication indicating a first number of beams for performing cell quality derivation on and a second indication indicating a second number of beams for performing measurement reporting on.

According to another aspect the object may be achieved by providing a wireless device that comprises processing circuitry configured to: obtain a first indication indicating a first number of beams for performing cell quality derivation on and a second indication indicating a second number of beams for performing measurement reporting on; perform a cell quality derivation taking the first indication into account; and to perform a measurement reporting of the second number of beams taking the second indication into account.

According to another aspect the object may be achieved by providing a radio network node comprising processing circuitry configured to transmit configuration data to the wireless device, wherein the configuration data comprises a first indication indicating a first number of beams for performing cell quality derivation on and a second indication indicating a second number of beams for performing measurement reporting on.

According to embodiments herein the wireless device can avoid the triggering of late measurement reports (e.g. by setting the first indication, such as N1, equal to one) and consequently the occurrences of handover failures and/or radio link failures. And, at the same time, the wireless device may provide more detailed beam-level information to the first radio network node about the beams from neighbor cells (e.g. setting the second indication, such as N2, more than 1). In other words, cell quality derivation could be triggered on the first number of beams e.g. best beam (N1=1) and the reporting configuration based on the second number of beams such as N2>1. Hence, embodiments herein improve the performance of the wireless communication network.

BRIEF DESCRIPTION OF THE DRAWINGS

Embodiments will now be described in more detail in relation to the enclosed drawings, in which:

FIG. 10a is a schematic combined flowchart and signalling scheme according to some embodiments herein.

DETAILED DESCRIPTION

Figure 1:
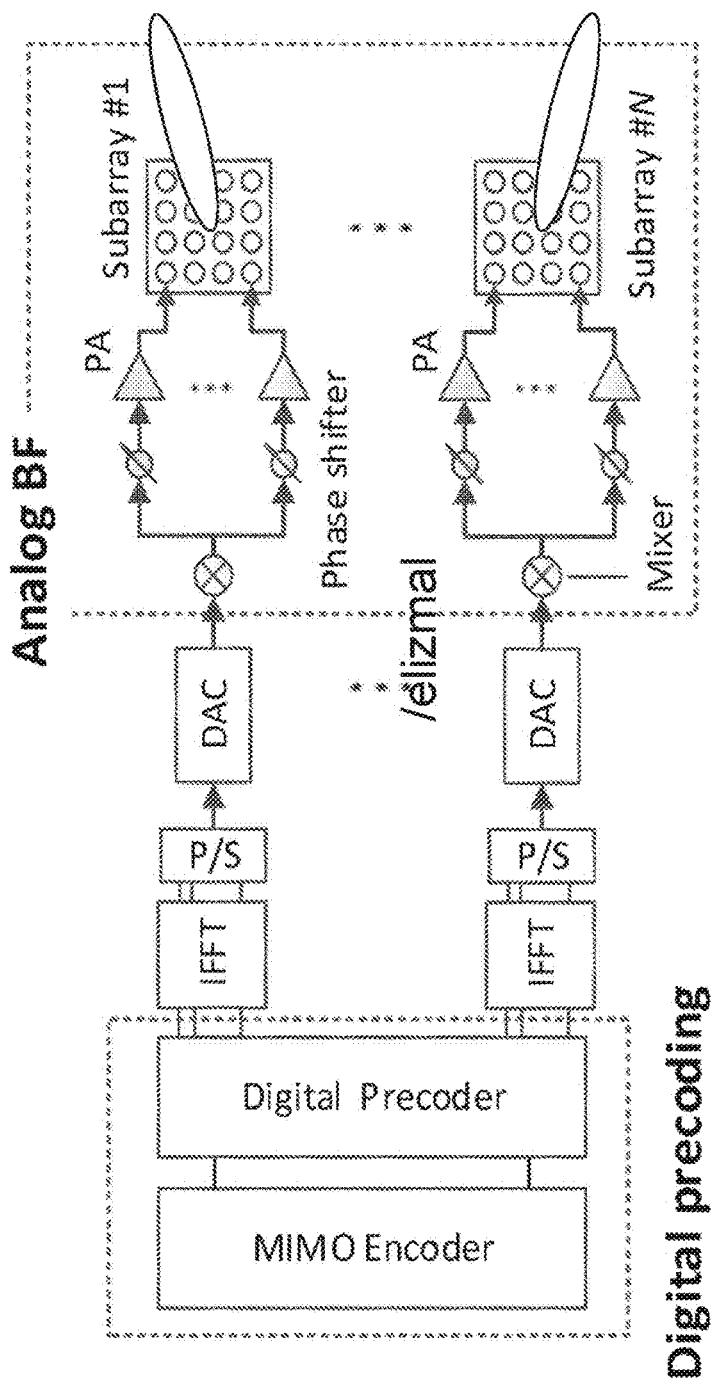
FIG. 1 shows an example of hybrid beamforming.
Figure 2:
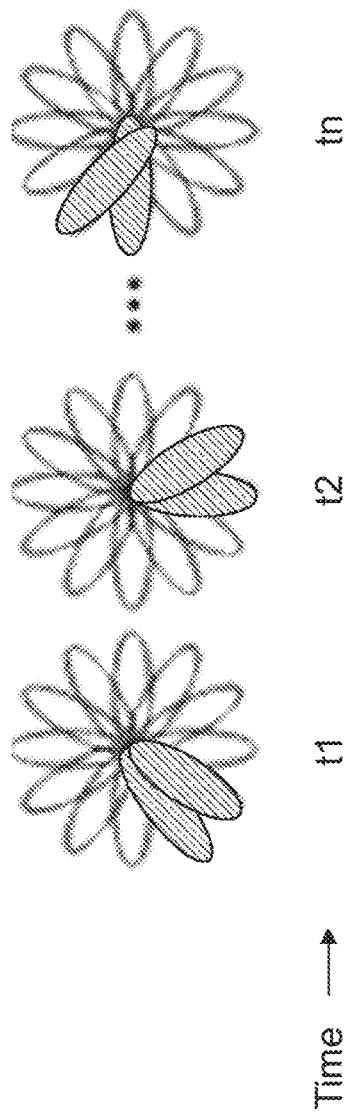
FIG. 2 shows a Tx beam sweeping on 2 subarrays.
Figure 3:
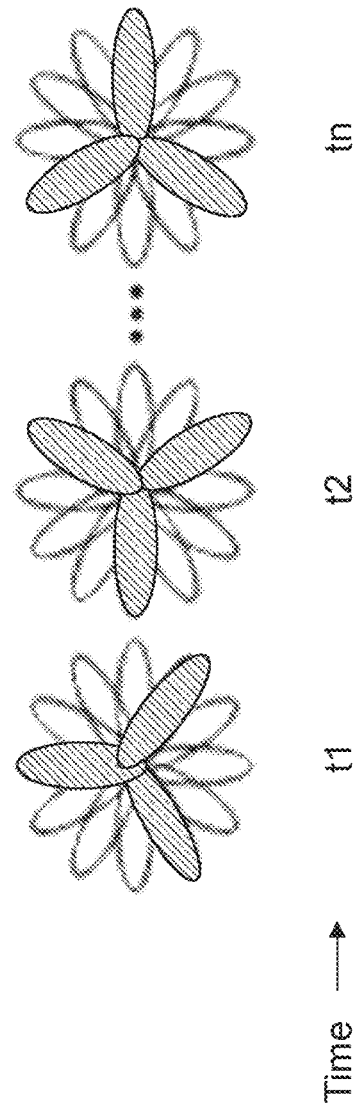
FIG. 3 shows a Tx beam sweeping on 3 subarrays.
Figure 4:
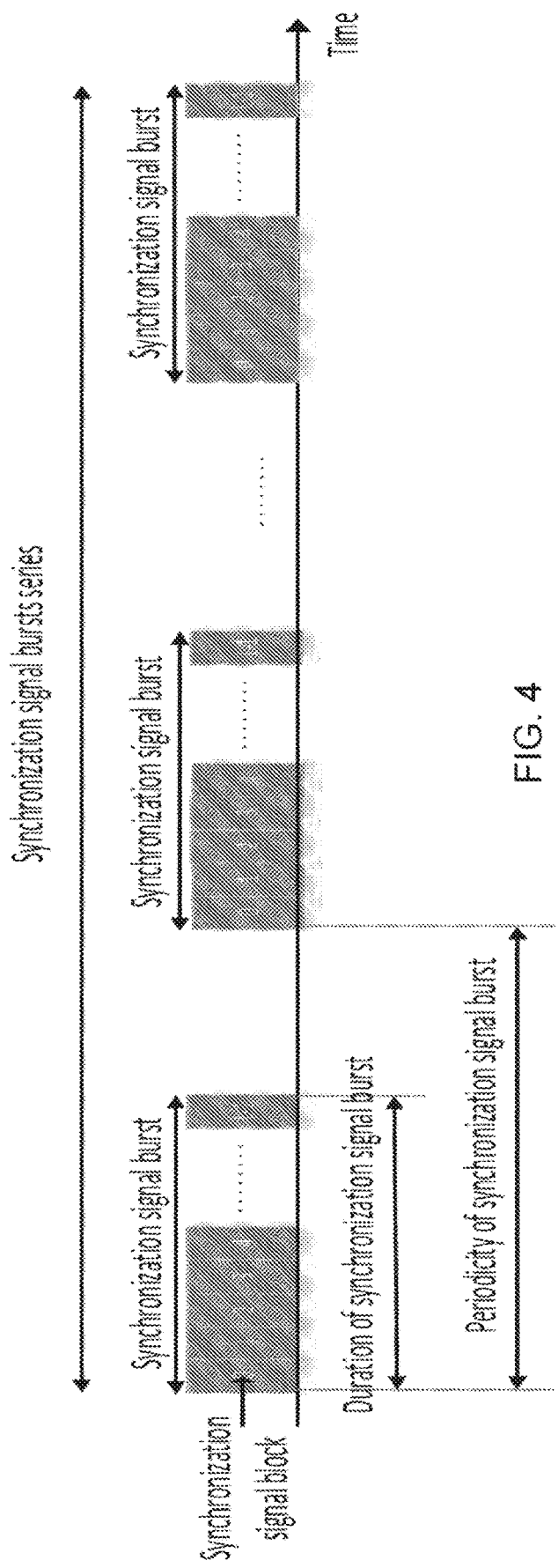
FIG. 4 shows an example configuration of SS blocks, SS bursts and SS burst sets/series.
Figure 5:
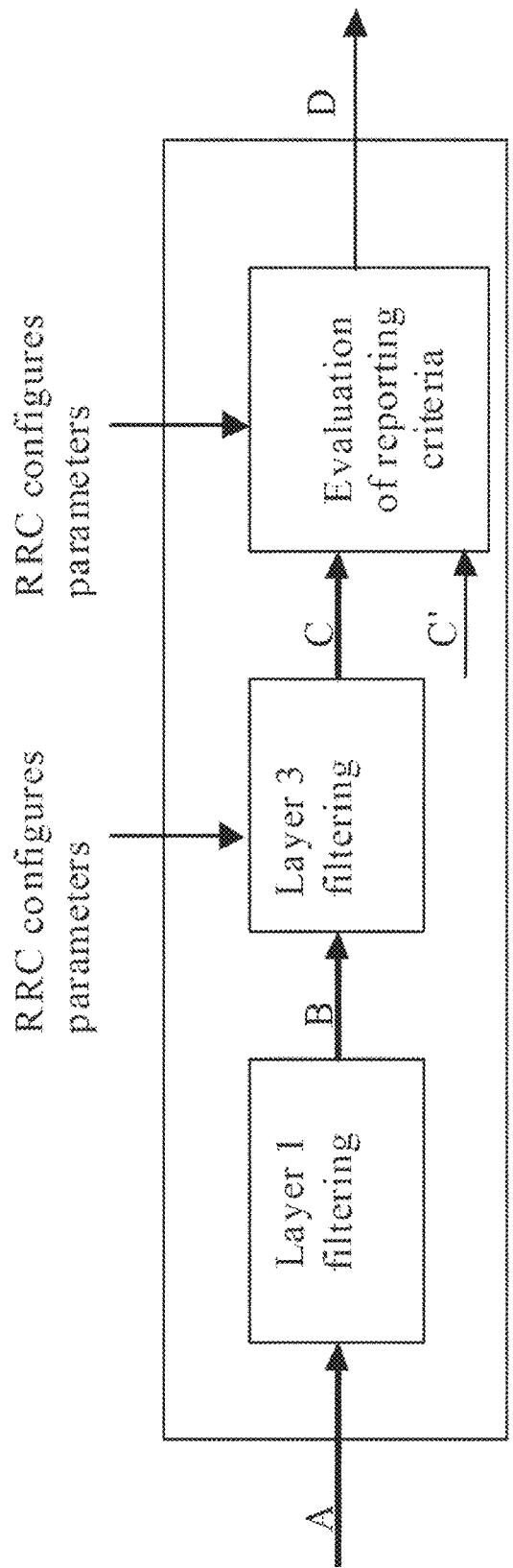
FIG. 5 shows an LTE wireless device filtering model.
Figure 6:
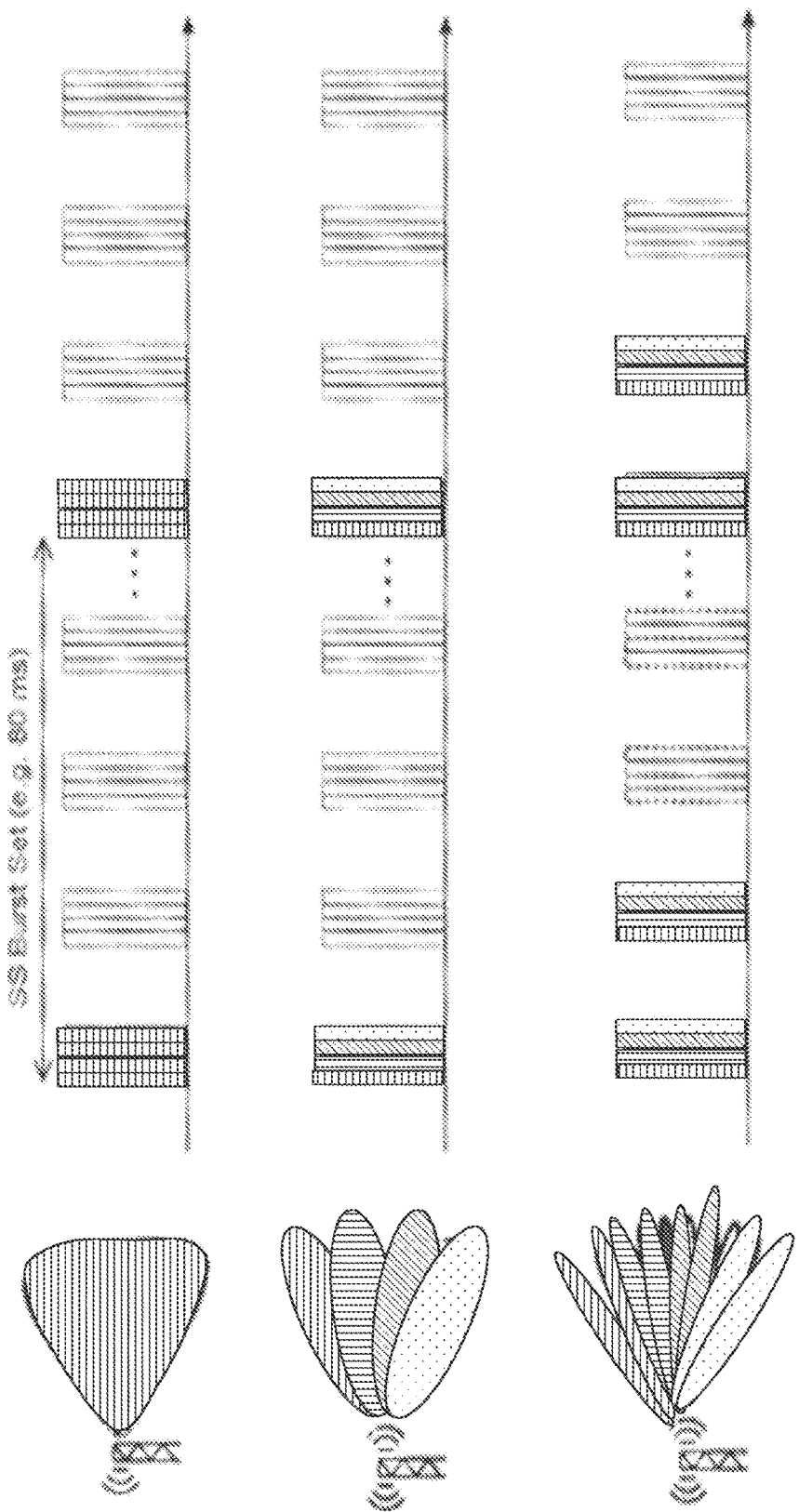
FIG. 6 shows examples of different configurations of an SS Burst Set.
Figure 7A:
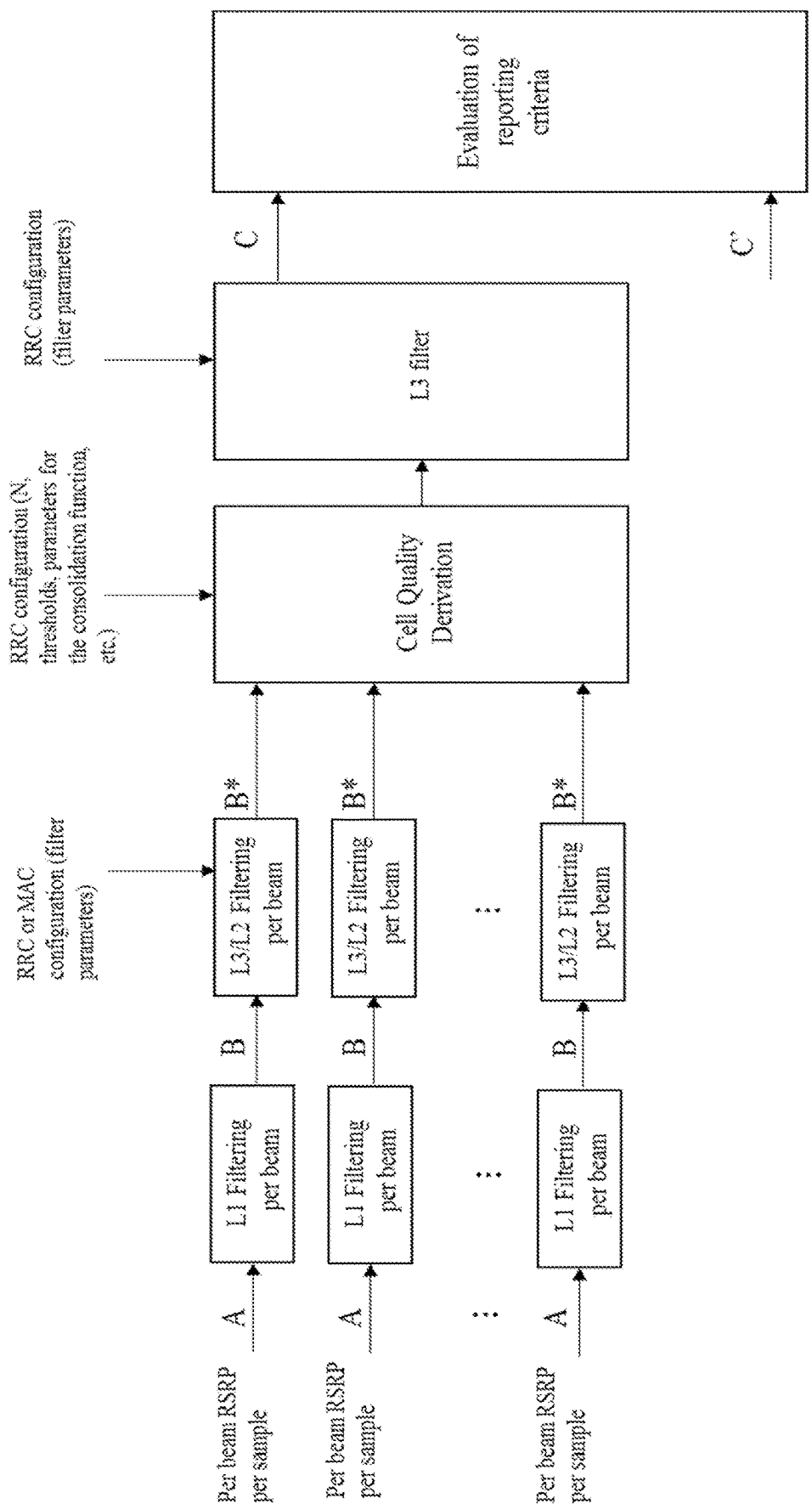
FIG. 7a shows a possible measurement model with L3/L2 standardized (i.e. configurable) filters per beam measurement.
Figure 7B:
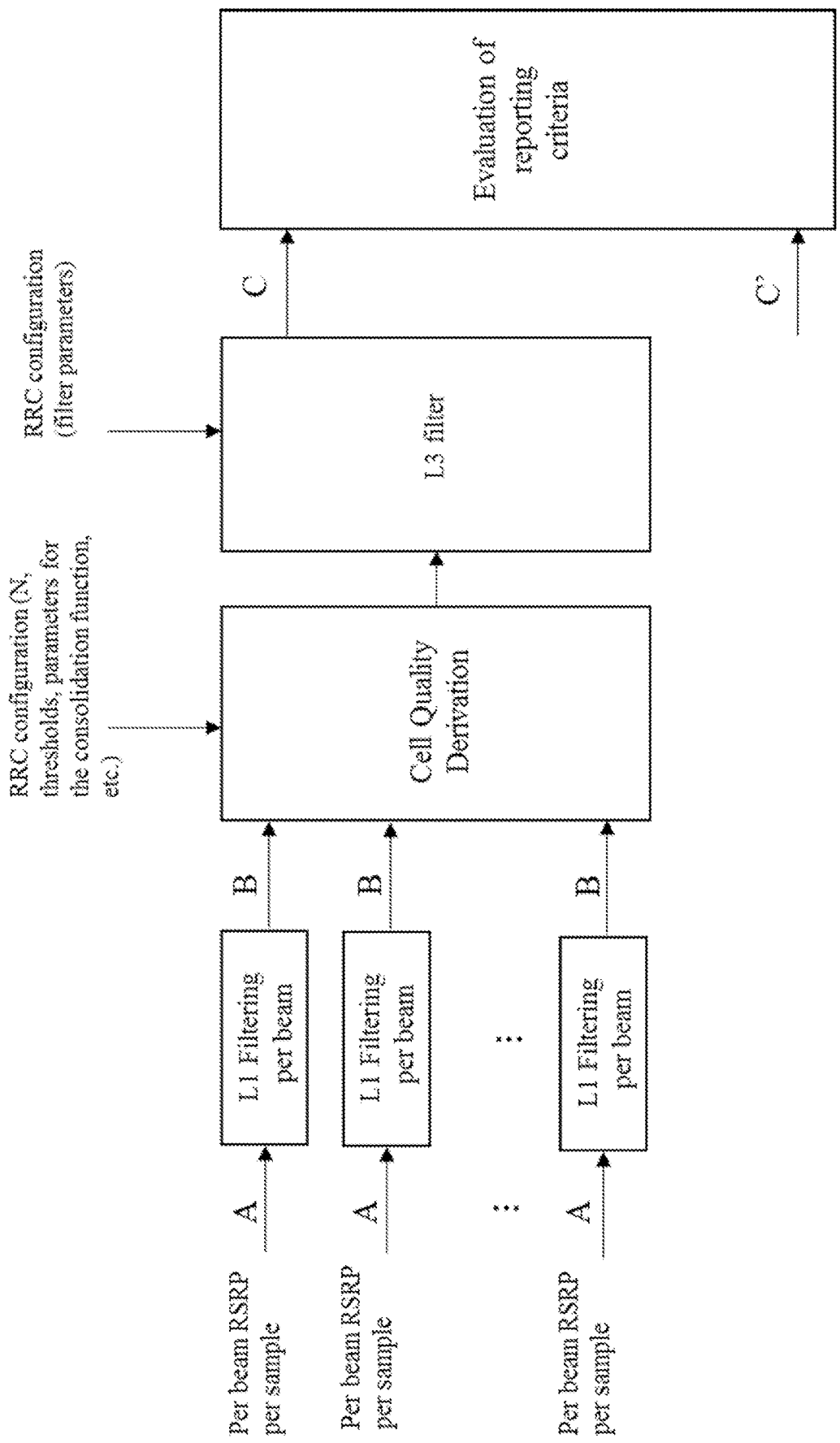
FIG. 7b shows a possible measurement model without any L3/L2 standardized (i.e. configurable) filters per beam measurement.
Figure 8:
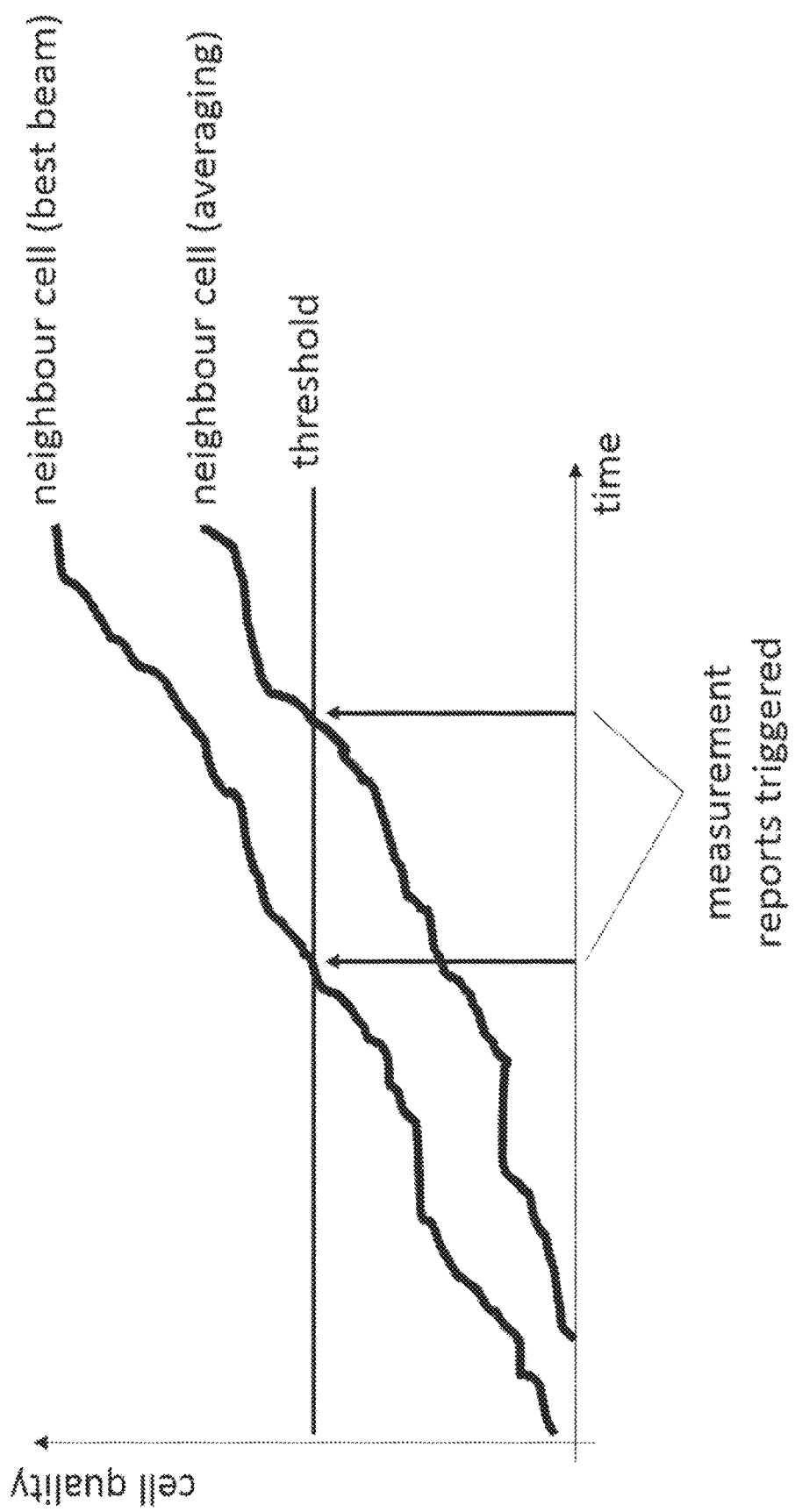
FIG. 8 shows timing of measurement reports with and without using averaging.
Figure 9:
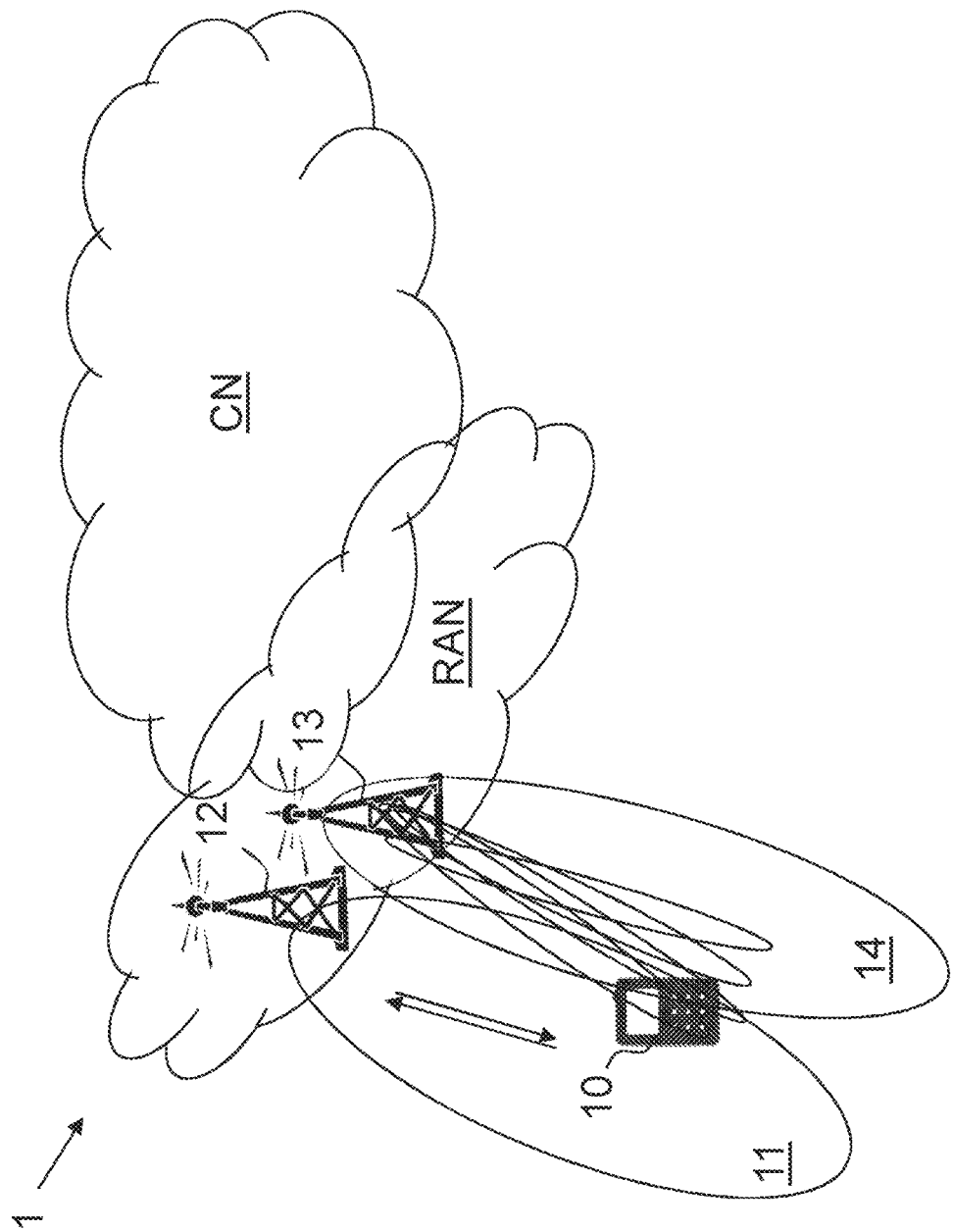
FIG. 9 shows a schematic overview depicting a wireless communication network according to embodiments herein.

Embodiments herein relate to wireless communication networks in general. FIG. 9 is a schematic overview depicting a wireless communication network 1. The wireless communication network 1 comprises one or more RANs and one or more CNs. The wireless communication network 1 may use one or a number of different technologies, such as New Radio (NR), Wi-Fi, LTE, LTE-Advanced, Fifth Generation (5G), Wideband Code-Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context. However, embodiments are also applicable in further development of the existing wireless communication systems such as e.g. WCDMA and LTE.

In the wireless communication network 1, a wireless device e.g. a wireless device such as a mobile station, a non-access point (non-AP) STA, a STA, a user equipment and/or a wireless terminal, communicates via one or more Access Networks (AN), e.g. RAN, to one or more core networks (CN). It should be understood by the skilled in the art that "wireless device" is a non-limiting term which means any terminal, wireless communication terminal, user equipment, Machine-Type Communication (MTC) device, Device-to-Device (D2D) terminal, or node e.g. smart phone, laptop, mobile phone, sensor, relay, mobile tablets or even a small base station capable of communicating using radio communication with a radio network node within an area served by the radio network node.

The wireless communication network 1 comprises a first radio network node 12, also referred to as merely the radio network node, providing radio coverage over a geographical area, a first service area 11 or a first beam/beam group, of a first radio access technology (RAT), such as NR, LTE, Wi-Fi, WiMAX or similar. The first radio network node 12 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), gNodeB, a base transceiver station, a radio remote unit, an Access Point Base Station, a base station router, a transmission arrangement of a radio base station, a stand-alone access point or any other network unit or node capable of communicating with a wireless device within the service area served by the first radio network node 12 depending e.g. on the first radio access technology and terminology used. The first radio network node 12 may be referred to as a serving network node wherein the first service area may be referred to as a source cell or beam, and the serving network node serves and communicates with the wireless device in form of DL transmissions to the wireless device 10 and UL transmissions from the wireless device 10.

A second radio network node 13 may further provide radio coverage over a second service area 14 or a second beam/beam group of a second radio access technology (RAT), such as NR, LTE, WiMAX or similar. The first RAT and the second RAT may be the same RAT or different RATs. The second radio network node 13 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), gNodeB (gNB), a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the second radio access technology and terminology used. The second radio network node 13 may be referred to as a neighbour network node wherein the second service area 14 may be referred to as a neighbouring beam, cell or target beam.

It should be noted that a service area may be denoted as a cell, a beam, a mobility measurement beam, a beam group or similar to define an area of radio coverage. The radio network nodes transmit reference signals (RS) over respective service area. Hence, the first and second radio network nodes may transmit CSI-RSs or beam reference signals (BRS), repeatedly, in time, in a large number of different directions using as many Tx-beams as deemed necessary to cover an operational area of the respective radio network node. Hence the first radio network node 12 provides radio coverage over the first service area using a first reference signal, e.g. first CSI-RS, for the first service area 11 in the wireless communication network 1. The second radio network node 13 provides radio coverage over the second service area 14 using a second reference signal, e.g. second CSI-RS, for the second service area 14 in the wireless communication network.

According to embodiments herein the wireless device 10 performs a cell quality derivation on a first number of beams and performs measurement reporting of a second number of beams. The first and second numbers may be decoupled e.g. different and/or separated.

The wireless device 10 obtains a first indication indicating the first number of beams on which the wireless device 10 is to perform the cell quality derivation function. The wireless device 10 further obtains a second indication indicating the second number of beams on which the wireless device 10 is to perform a cell reporting function. The wireless device 10 may obtain the indications internally, e.g. being pre-configured with the first and/or the second indication, or externally, e.g. receiving the first and/or the second indication from the first radio network node 12 either separately or together. The first and second number of beams may be different.

In one embodiment the two indications are two parameters and are defined as N1 and N2. N1 is defined for the cell quality derivation function i.e. the first indication indicating the first number of beams to use for performing cell quality check on, while N2 is defined for the beam level reporting configuration (which could be part of a specific mobility event configuration) i.e. the second indication indicating the second number of beams to use for performing beam level reporting on. The first radio network node 12 may configure N1=1 and N2>1 so the wireless device 10 will trigger measurement reports based on a cell quality taking into account only the best e.g. strongest beam of e.g. the second radio network node 13 while the first radio network node 12 may get information about N2 multiple beams of that same cell or the radio network node 13.

The parameter N1, used in multi-beam cell scenarios to define the first number of beams the wireless device 10 should consider to derive the cell quality, may be configured at least per carrier frequency to minimize the amount of needed configuration and required inter-node coordination, i.e. coordination between different nodes.

These first and/or second indications e.g. parameters N1 and N2 may be configured by the first radio network node 12 via broadcast and/or dedicated signalling which can be:

Per wireless device within a cell;
Per wireless device across multiple cells;
Per cell;
Per carrier;
Per carrier and per cell, e.g. with cell specific values that overrides the one per carrier and/or offsets.

Note: any other combination is not precluded i.e. N1 may be configured per carrier while N2 may be configured per cell.

In some embodiments only one parameter N exists for both the cell quality derivation and the measurement reporting configuration. Hence, to achieve the desired decoupling the first radio network node 12 may configure the cell quality derivation function or the cell quality derivation function in such a way that the effect of the average is equivalent to the usage of the best beam only, i.e. N1=1, where N1 has been previously described. This may be done by using a weighted average with parameter settings where a best beam quality is set to its maximum while the parameters of the N−1 best beams are set to the minimum (e.g. zero, in the case of a liner average) such as way that:

Cell quality derivation=alpha($N1$)*best beam RSRP+ alpha($N1-1$)*$2^{nd}$ best beam RSRP+ . . . +alpha(1)*$N^{th}$ best beam RSRP.

Thus N will simply control the number of reported beams for ping-pong avoidance.

Another way to achieve that is to use a linear average for the beam level measurements instead of the average of the values in dB. By defining a linear average, the best beam quality is the one mainly impacting the cell quality, having a similar effect as setting N=1, especially combined with a setting of a low value for the relative quality threshold:

Cell quality derivation=best beam linear−RSRP+$2^{nd}$ best beam linear−RSRP+ . . . +$N^{th}$ best beam linear−RSRP.

In some embodiments the same quality threshold(s) to define "good" beams are defined for both the cell quality derivation function and the measurement reporting configuration. Hence, to achieve the desired decoupling the first radio network node 12 may configure the cell quality derivation function in such a way that the effect of the average is equivalent to the usage of the best beam only, i.e. N1=1, where N1 has been previously described. That is done by using a weighted average with parameter settings where best beam quality is set to its maximum while the parameters of the N−1 best beams are set to the minimum (e.g. zero, in the case of a linear average) such as way that:

Cell quality derivation=alpha($N1$)*best beam RSRP+ alpha($N1-1$)*$2^{nd}$ best beam RSRP+ . . . +alpha(1)*$N^{th}$ best beam RSRP.

In these embodiments, the threshold(s), may either be an absolute, a relative (to the best beam), or both absolute and relative (to the best beam) and will simply control the quality of the reported beams for ping-pong avoidance.

In some embodiments, the parameter N is only related to the measurement reporting configuration, also known as beam reporting, if no parameter is provided for the cell quality derivation. In that case, N is used for measurement reporting and N=1 is assumed for the neighbour cells for cell quality derivation.

In another embodiment, parameters controlling the definition of good beams and number of beams for cell quality derivation and measurement reporting configuration can be defined differently for different reference signals. Since both cell quality and measurement reports can be based on SS Block, e.g. PSS, SSS, both PSS/SSS, PSS/SSS/DM RS of PBCH, or any other combination of RS(s) transmitted in the SS Block, or CSI-RS, there may be a differentiation between the cell quality derivation function and reporting for e.g. SS and CSI-RS. For example, if SS is used, two levels of parameters are used, while if CSI-RS is used, another two levels of parameters are used.

For the embodiments where two groups of parameters for the different functions are defined (i.e. cell quality derivation and measurement reporting configuration), one set of parameters can be configured in one manner while the other set in another manner. For example, the parameters related to cell quality derivation may need to be available for IDLE/INACTIVE wireless devices, while parameters related to the measurement reporting are only relevant for CONNECTED mode wireless devices. Hence, the parameter(s) for cell quality derivation may be broadcasted in System Information per cell, while the parameters related to measurement reporting may be configured using dedicated RRC signalling such as a measurement configuration.

FIG. 10a is a combined flowchart and signaling scheme according to embodiments herein.

Action 1001. The first radio network node 12 may transmit configuration data such as a beam tracking configuration e.g. a neighbour cell beam tracking configuration, to the wireless device 10. The first radio network node 12 may configure the wireless device 10 with the configuration data comprising the first indication and/or the second indication, each associated with a measurement parameter. The indication or indications may be configured:
  Per wireless device within a cell;
  Per wireless device across multiple cells;
  Per cell;
  Per carrier;
  Per carrier and per cell, e.g. with cell specific values that overrides the one per carrier and/or offsets.

Thus, the wireless device 10 obtains the first and second indications, e.g. receives the configuration data separately or together from the first radio network node 12.

Action 1002. The wireless device 10 may apply the first and second indication for performing the cell quality check and for the beam level reporting. The configuration data may contain (or comprise) K(i) number of tracked beams per cell, N1 number of beams for checking cell quality, N2 number of reported beams, per beam per neighbor cell filter parameters, beam tracking triggering info, CSI-RS configuration per neighbor cell etc. A detectable cell will always have at least one beam which should be interpreted by the wireless device 10 as the best beams. Hence, in the case of N>1 the wireless device 10 may detect different number of beams for different detected cells, including its serving cell. Hence, the parameter N should be interpreted as the maximum number of beams to be considered in the cell quality derivation and/or number of beams to be reported. Notice that the term N is used but that could also be N1 or N2, in the case two different parameters are configured for the wireless device 10. In some embodiments, different thresholds may also be defined or configured for the wireless device 10: threshold-1 and threshold-2. Threshold-1 is defined for the cell quality derivation function, while Threshold-2 is defined for the beam level reporting configuration (which could be part of a specific mobility event configuration). That enables, for example, the network to configure threshold-1>threshold-2 so the wireless device 10 will not trigger too late measurement reports (which could lead to handover failures and/or radio link failures) and, at the same time, send more beam level related information by setting higher values for threshold-2 so more granular beam level information per neighbour cell can be reported.

The beam level information per cell associated with the beam level reporting configuration can either be RSRP and/or Reference Signal Received Quality (RSRQ) and/or Signal to Interference plus Noise Ratio (SINR) or any other quality metric, e.g. Channel Quality Information (CQI), Channel State Information (CSI) reports, etc., values for these beams, possibly filtered according to the beam level reporting configuration e.g. provided via RRC and/or MAC signalling. The beam level information can also be some kind of implicit or explicit beam indexes of the N2 best beams.

The thresholds can be absolute or relative (to the best beam) or both absolute and relative (to the best beam) thresholds. The N1 "good" beams are the ones used for the computation of the cell quality. The N2 "good" beams are the ones used to be included in the measurement reports. The "good" beams are the ones whose filtered beam quality>absolute threshold or filtered beam quality>filtered best beam quality-relative threshold. These filtered values can also be configured differently for the cell quality derivation function and the measurement reporting/events configuration The beam level information per cell can be some kind of beam-related index of the N2 best beams (controlled by the threshold-2). Like that, early reports can come but network can prioritize handovers for cells with a higher number of "good" beams.

Action 1003. The neighbor cell 'a', e.g. the second radio network node 15, may transmit one or more beamformed CSI-RSs or SS blocks for respective beam (e.g. for beams 1 to M(i) of that neighbor cell).

Action 1004. The wireless device 10 performs measurements on the second number of beams, e.g. beam tracking. For example, the wireless device 10 may measure signal strength or quality of CSI-RSs or SS blocks for respective beam.

Action 1005. The wireless device 10 may then report the measurements for the second number of beams e.g. as indicated by the second indication. That is the wireless device 10 transmits a measurement report of the second number of beams, which may be defined by the second indication such as N2.

Action 1006. The wireless device 10 further performs cell quality derivation on the first number of beams e.g. as indicated by the first indication.

Action 1007. The wireless device 10 may then report the cell quality to the first radio network node 12. That is the wireless device 10 transmits e.g. a quality report of the first number of beams, which may be defined by the first indication such as N1.

Action 1008. The first radio network node 12 may transmit a handover command to the wireless device 10 indicating a neighbor cell to handover to, based on the reported cell quality. Upon receiving measurement reports containing cell quality such as RSRP (based on a number of configured beams) per reported neighbor cells and beam-level quality per cell (based on a number of configured beams, not necessarily the same) the first radio network node 12 may decide to prioritize the neighbors cells as handover target candidates having a higher number of reported beams to avoid ping-pong. At the same time, the first radio network node 12 should define its own quality difference so that if a cell has fewer good beams but it is much better than the best beams of another cell, the cell with a fewer beams should be prioritized. Assuming the first radio network node 12 has these information available these parameters can be reported later. In other words, if there are two neighbor cells A and B with comparable quality and A has more good beams compared to B, then the network should prioritize the cell with more good beams. That has the potential to avoid or reduce ping-pong handovers.

Action 1009. The wireless device 10 may then initiate a random access procedure to the second radio network node 13 based on the handover command.

Figure 10B:
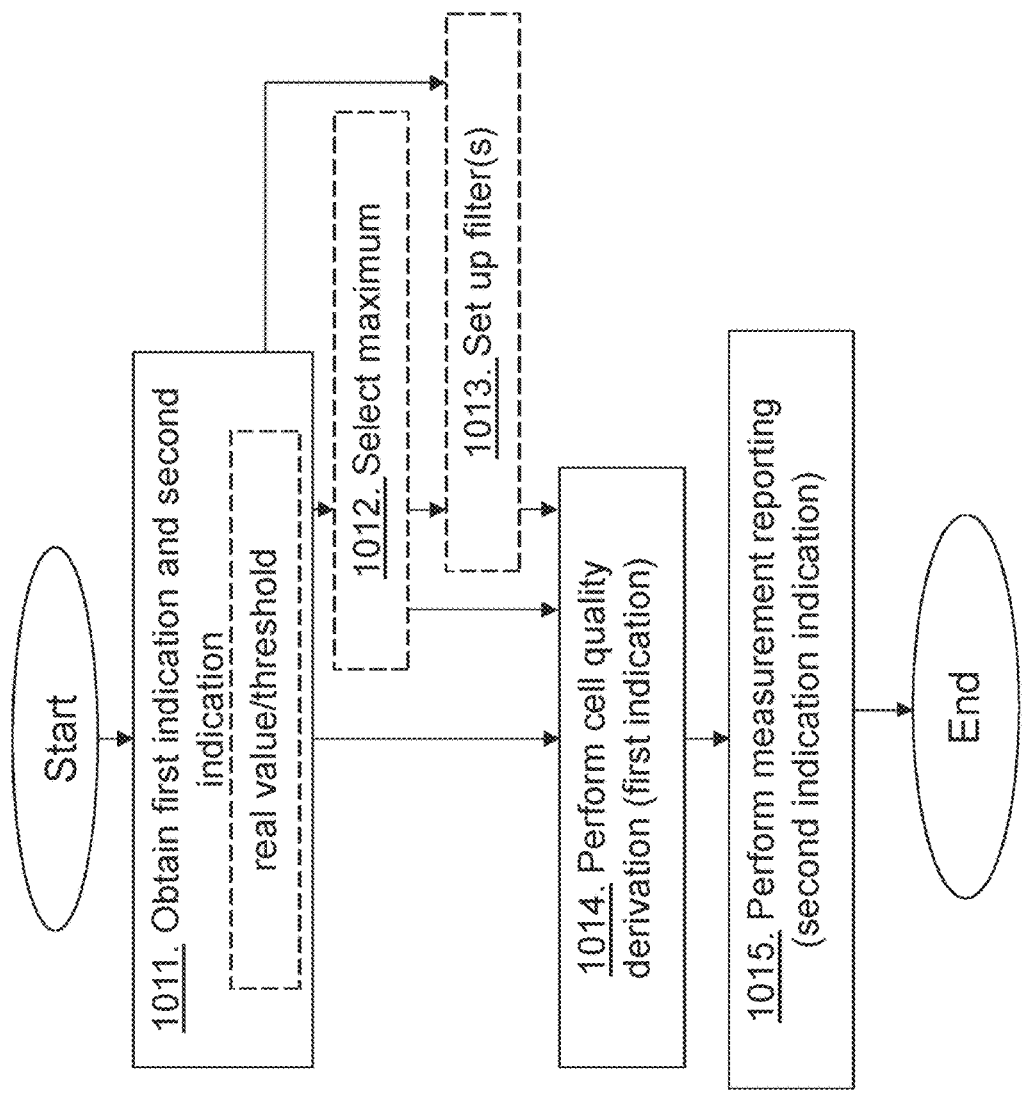
FIG. 10b shows a flowchart depicting a method performed by a wireless device according to embodiments herein.

The method actions performed by the wireless device 10 for handling communication of the wireless device 10 in the wireless communication network 1 according to embodiments will now be described with reference to a flowchart depicted in FIG. 10b. The actions do not have to be taken in the order stated below, but may be taken in any suitable order. Actions performed in some embodiments are marked with dashed boxes. The radio network node, such as the first radio network node 12, serves the wireless device 10.

Action 1011. The wireless device 10 obtains the first indication indicating the first number of beams for performing cell quality derivation on and the second indication indicating the second number of beams for performing measurement reporting on. The first indication and the second may be received from the radio network node, separately or in one message. The first indication may be a function using the second indication. The first indication may thus be obtained using the second indication. The wireless device may receive configuration data from the radio network node. The configuration data may comprise the first indication indicating the first number of beams for performing cell quality derivation on and the second indication indicating the second number of beams for performing measurement reporting on. The first and second numbers may be different. The first indication may indicate that the first number of beams is one. E.g. the wireless device 10 may obtain the first indication by assuming the first indication to indicate that the first number of beam is one when no indication is received by the wireless device, or when only receiving the second indication from the radio network node. Furthermore, the first and/or the second indication may be a real value defining the number of beams and/or a threshold value defining best beams. The respective threshold may be defined differently for different reference signals thus affecting number of beams to measure on. In some embodiments, the different indications or notions, or number of, of best beams are defined for the cell quality derivation and a configuration of measurement reports. In other words, the radio network node may configure the wireless device to compute cell quality based on the first number of beams e.g. N1=1 and configure another parameter, i.e. the second indication, that indicates to the wireless device that measurements for a second number of best beams per cell should be reported. Similar to a real value N defining the number of beams, the indications may additionally or alternatively be thresholds that define the best beams which thresholds possibly may be configured differently so that the radio network node can trigger the cell quality only based on quite good beams, i.e. with quality very close to the best beam, while it might want to obtain e.g. beam-level Reference Signal Received Power (RSRP) and/or equivalent beam level information for beams that are worse, to see how much worse they are e.g. to better improve the ping-pong vs. handover failure tradeoff. Some configuration embodiments are also herein disclosed where the wireless device 10 may be implicitly configured with the first indication such as N=1. In other words, if no parameter is provided to the wireless device 10, the wireless device 10 assumes the first indication such as N=1. Alternative, if a single indication such as the second indication e.g. N is provided to the wireless device, the wireless device simply assumes the first indication as N=1 for cell quality derivation although the wireless device reports information associated to the N best beams.

Action 1012. The wireless device 10 may upon receiving the first and the second indications about numbers of beams, select a maximum among these two indications to initiate a number of filters to perform per beam measurement.

Action 1013. The wireless device 10 may, if the first number of beams for cell quality derivation is higher than the second number of beams for measurement reporting, set up a maximum number of filters. The wireless device may, if the first number of beams for cell quality derivation is lower than the second number of beams for measurement reporting, set up a maximum number of filters.

Action 1014. The wireless device 10 then performs a cell quality derivation taking the first indication into account. The numbers of beams configured by the radio network node to be used by the wireless device 10 for cell quality derivation and measurement reporting may be interpreted as the maximum number of beams to be averaged to compute cell quality derivation.

Action 1015. The wireless device 10 further performs measurement reporting of the second number of beams taking the second indication into account.

E.g. the wireless device 10 may for cell quality derivation use all values that fulfill one or more conditions, e.g. over a threshold, for cell quality derivation while only a subset for measurement reporting. E.g. the wireless device 10 receives indication of number of beams N and a threshold. Cell quality derivation or cell quality for short is then computed by using the best beam averaged with the remaining beams above threshold, where the average does not exceed N. Alternatively, the wireless device 10 may perform cell quality derivation using a subset of values for cell quality derivation while include all available filtered values in the measurement reports.

Figure 10C:
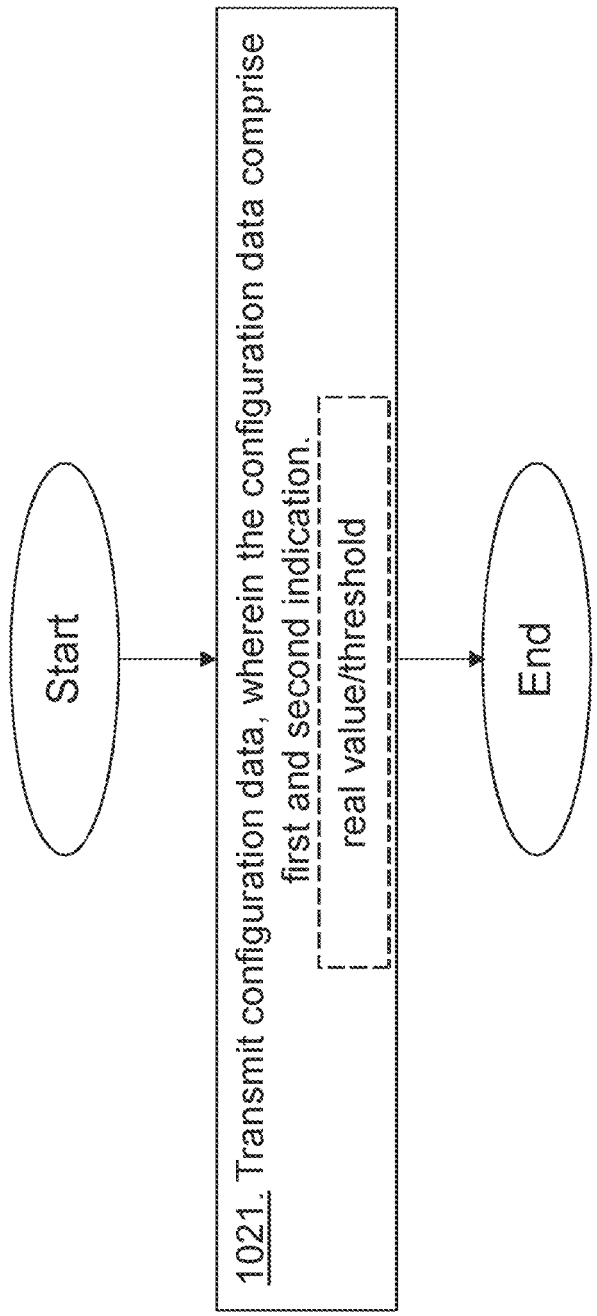
FIG. 10c shows a flowchart depicting a method performed by a radio network node according to embodiments herein.

The method actions performed by the radio network node exemplified herein as the first radio network node 12 for handling communication of the wireless device 10 in the wireless communication network 1 according to embodiments will now be described with reference to a flowchart depicted in FIG. 10c. The radio network node 12 serves the wireless device 10.

Action 1021. The first radio network node 12 transmits configuration data to the wireless device 10, see action 1001. The configuration data comprises the first indication indicating the first number of beams for performing cell quality derivation on and the second indication indicating the second number of beams for performing measurement reporting on. The first and second numbers may be different.

Figure 11A:
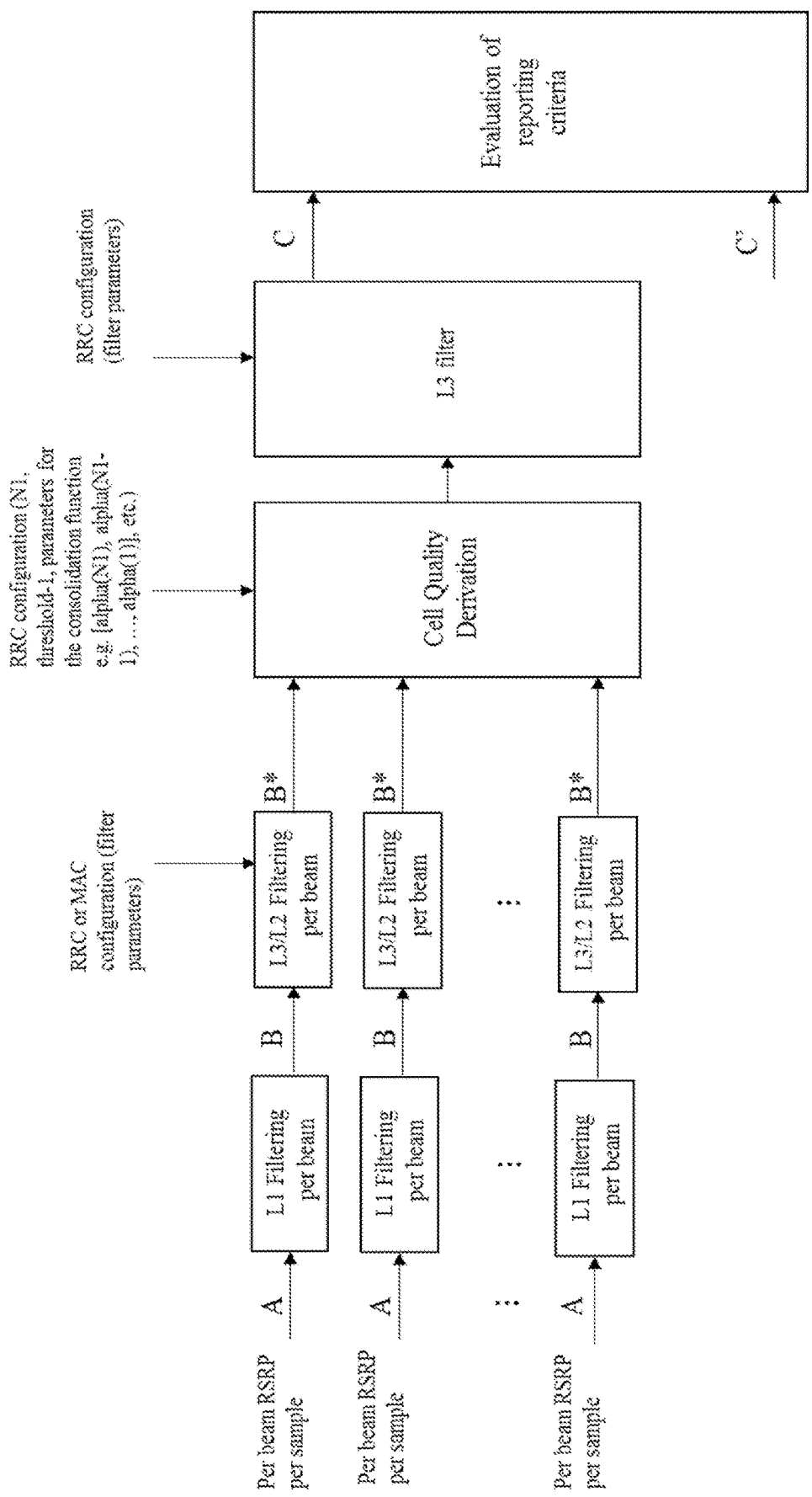
FIG. 11a shows a measurement model implementing embodiments herein with L3/L2 standardized (i.e. configurable) filters per beam measurement.

FIG. 11a shows a measurement model implementing embodiments herein with L3/L2 standardized (i.e. configurable) filters per beam measurement. A sample per beam reference signal received power (RSRP), A, is fed to a respective L1 filtering. The layer 1 filtered output, B, is fed to L3/L2 filters per beam. The L3/L2 filters use RRC or MAC configuration such as filter parameters. The L3/L2 filtered output B* is fed to the cell quality derivation. The cell quality derivation uses e.g. RRC configuration such as the first indication N1, threshold-1, parameters for consolidation function e.g. [alpha(N1), alpha (N1−1), . . . , alpha (1)], etc. The derivate output is the fed to a L3 filter using RRC configuration e.g. filter parameters. The L3 derivate, C, is then fed to the evaluation of reporting criteria e.g. the derivate to be reported to the radio network node or not. C' is the input to measurement report.

Figure 11B:
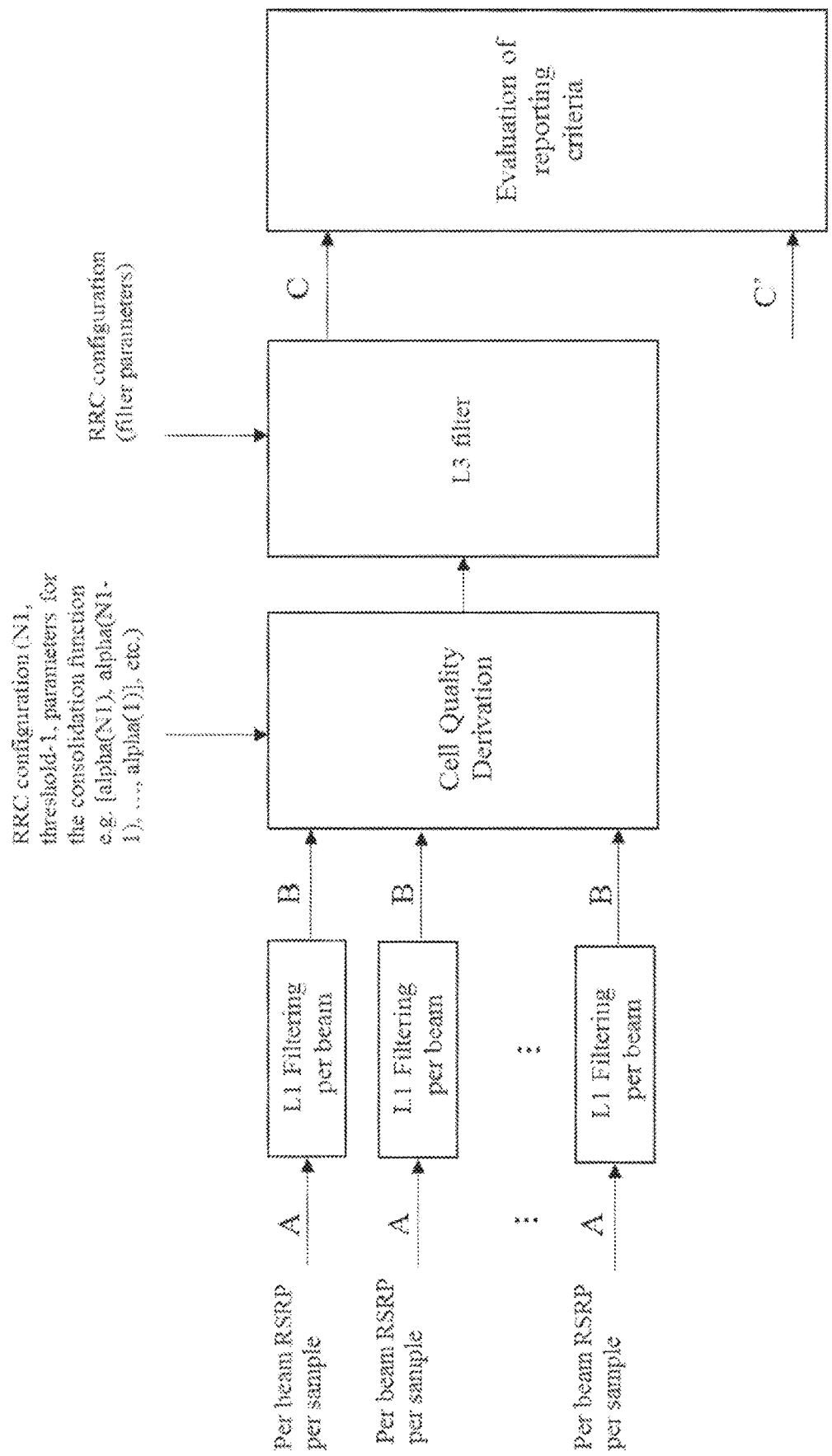
FIG. 11b shows a measurement model implementing embodiments herein without L3/L2 standardized (i.e. configurable) filters per beam measurement.

FIG. 11b shows a measurement model implementing embodiments herein without L3/L2 standardized (i.e. configurable) filters per beam measurement. A sample per beam e.g. reference signal received power (RSRP), A, is fed to a respective L1 filtering. The layer 1 filtered output, B, is fed to the cell quality derivation. The cell quality derivation uses e.g. RRC configuration such as the first indication N1, threshold-1, parameters for consolidation function e.g. [alpha(N1), alpha (N1−1), . . . , alpha (1)], etc. The derivate output is the fed to a L3 filter using RRC configuration e.g. filter parameters. The L3 derivate, C, is then fed to the evaluation of reporting criteria e.g. the derivate to be reported to the radio network node or not.

Figure 12A:
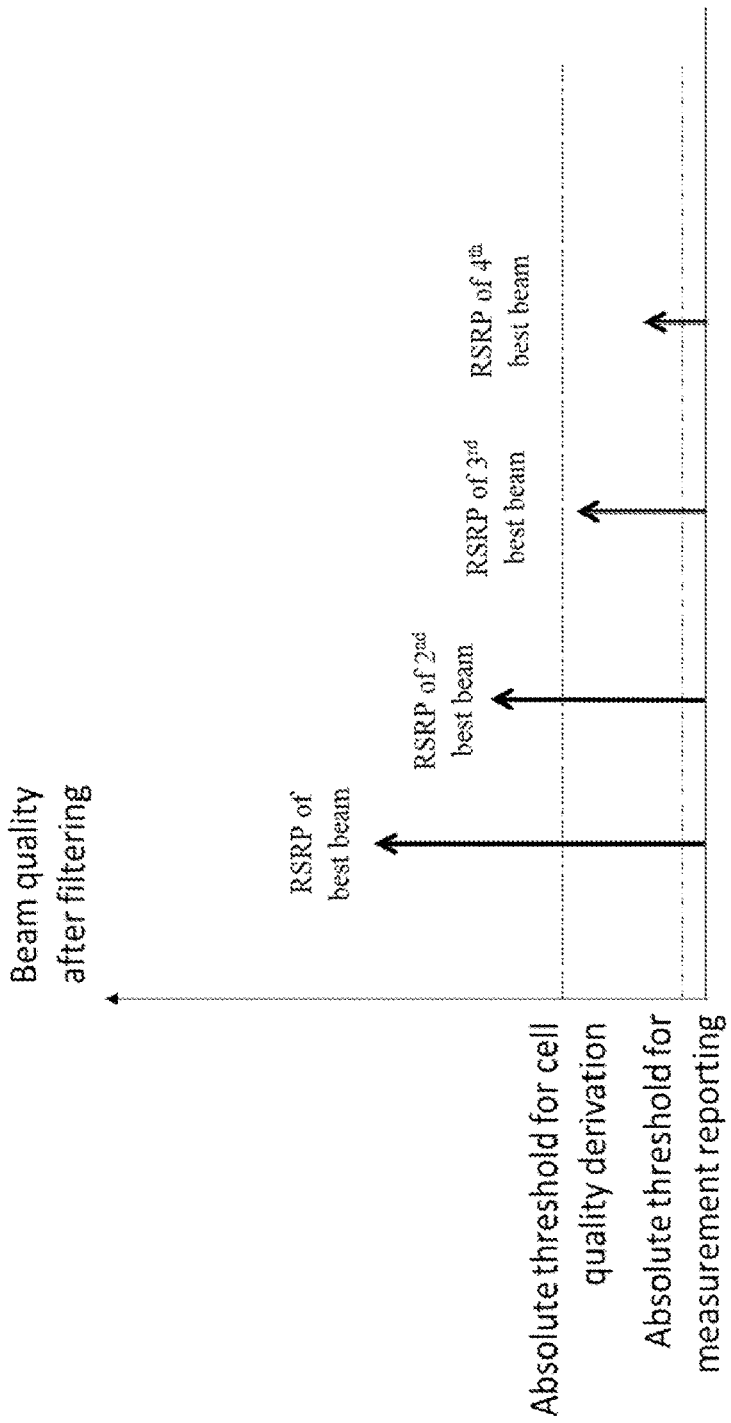
FIG. 12a shows beam qualities after filtering of a number of best beams.

FIG. 12a shows where the best and the second best are 'good' beams for cell quality derivation as indicated by the absolute threshold for cell quality derivation, thus the threshold may indicate the first number of beams. The best, the second best, the third best and the fourth best are all 'good' to be reported in a measurement report as indicated by the absolute threshold for measurement reporting, thus the threshold may indicate the second number of beams.

Figure 12B:
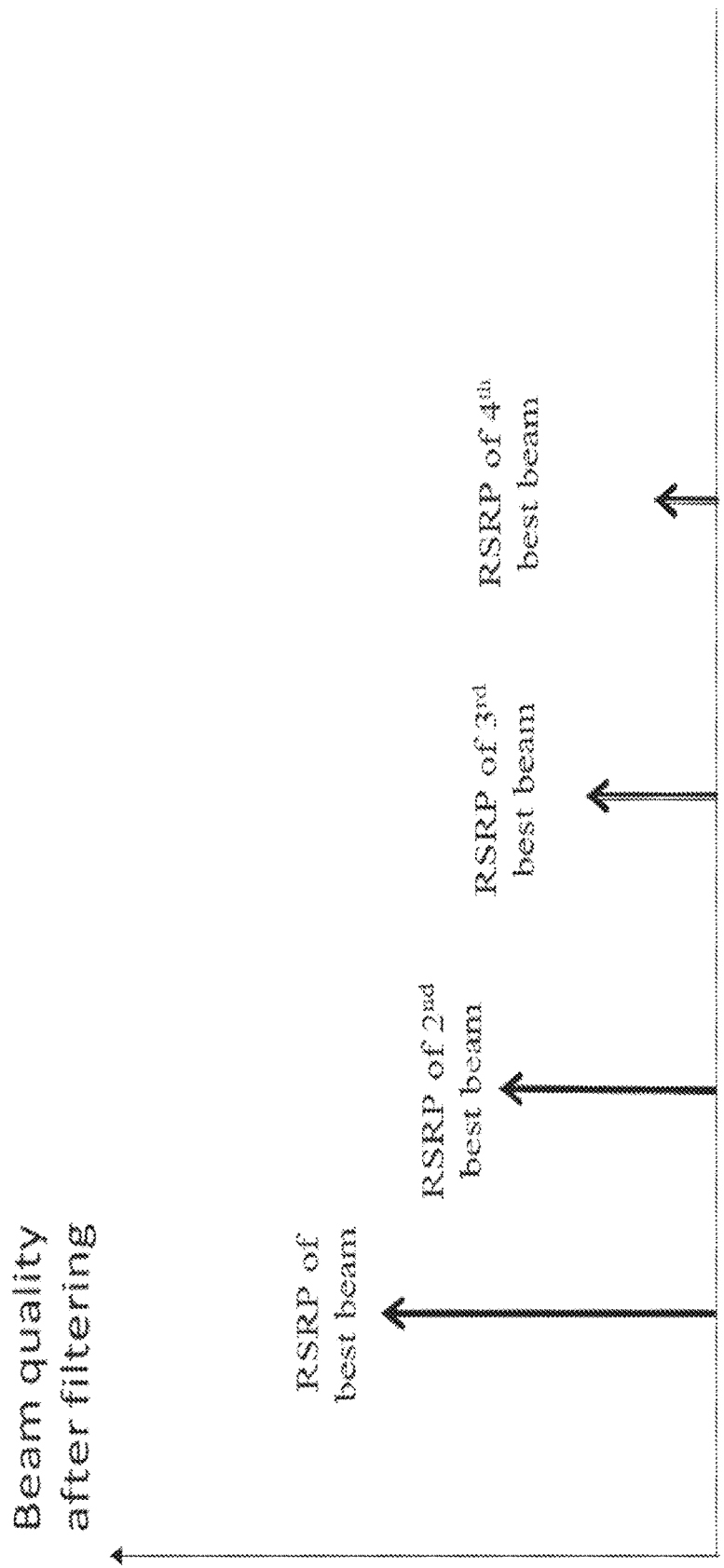
FIG. 12b shows beam qualities after filtering of a number of best beams.

FIG. 12b shows where N1 is configured as N1=1, while N2 is configured as N2=3. In that case, only the best beam is used for cell quality derivation while information of the three best beams are reported in a measurement report.

Figure 13:
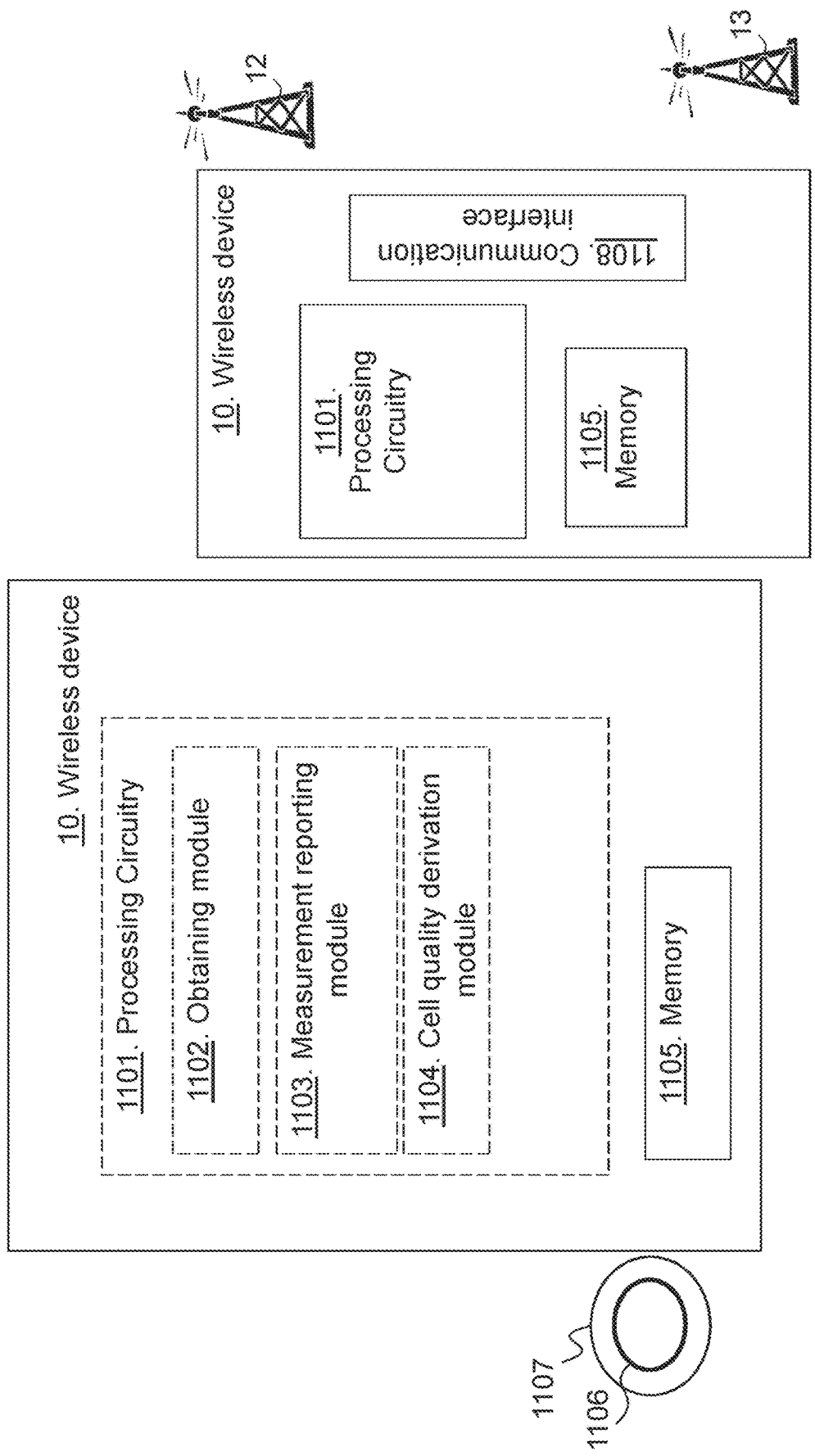
FIG. 13 is a block diagram depicting a wireless device according to embodiments herein.

FIG. 13 is a block diagram depicting two embodiments of the wireless device 10 according to embodiments herein for handling communication (e.g. handling handovers) of the wireless device 10 in the wireless communication network 1. The first radio network node 12 is configured to serve the wireless device 10.

The wireless device 10 may comprise processing circuitry 1101, e.g. one or more processors, configured to perform the methods herein.

The wireless device 10 may comprise an obtaining module 1102, e.g. a receiver, a transceiver, a configuration module such as an applying module. The wireless device 10, the processing circuitry 1101, and/or the obtaining module 1102 may be configured to obtain the first indication and the second indication. The first indication indicates the first number of beams for performing cell quality derivation on and the second indication indicates the second number of beams for performing measurement reporting on. The first and second numbers are decoupled by being different.

The wireless device 10 may comprise a measurement reporting module 1103. The wireless device 10, the processing circuitry 1101, and/or the measurement reporting module 1103 is configured to perform measurement reporting of the second number of beams e.g. as indicated by the second indication.

The wireless device 10 may comprise a cell quality derivation module 1104, e.g. a transmitter or a transceiver. The wireless device 10, the processing circuitry 1101, and/or the cell quality derivation module 1104 is configured to perform cell quality derivation on the first number of beams, e.g. as indicated by the first indication. The first and second numbers are decoupled from one another, also referred to as different.

The wireless device 10 performs a cell quality derivation based on a first measurement condition i.e. first number of beams. The wireless device 10 further performs measurement reporting of beam level information based on a second measurement condition. The first and second measurement conditions are decoupled from one another, also referred to as different, that is, not the same condition. Hence, the first measurement condition may be the first number and the second measurement condition may be the second number.

The wireless device 10 further comprises a memory 1105. The memory comprises one or more units to be used to store data on, such as indications, number of beams, measurements, thresholds, applications to perform the methods disclosed herein when being executed, and similar.

The methods according to the embodiments described herein for the wireless device 10 are respectively implemented by means of e.g. a computer program product 1106 e.g. a computer program, comprising instructions, i.e., software code portions, which, when executed on at least one processor, cause the at least one processor to carry out the actions described herein, as performed by the wireless device 10. The computer program product 1106 may be stored on a computer-readable storage medium 1107, e.g. a disc, a universal serial bus (USB) stick or similar. The computer-readable storage medium 1107, having stored thereon the computer program product, may comprise the instructions which, when executed on at least one processor, cause the at least one processor to carry out the actions described herein, as performed by the wireless device 10. In some embodiments, the computer-readable storage medium may be a non-transitory computer-readable storage medium.

Thus, the wireless device may comprise the processing circuitry and the memory, said memory comprising instructions executable by said processing circuitry whereby said wireless device 10 is operative to perform the methods herein. The wireless device 10 may comprise processing circuitry configured to obtain the first indication indicating the first number of beams for performing cell quality derivation on and the second indication indicating the second number of beams for performing measurement reporting on. The processing circuitry is further configured to perform the cell quality derivation taking the first indication into account, and to perform the measurement reporting of the second number of beams taking the second indication into account.

Figure 14:
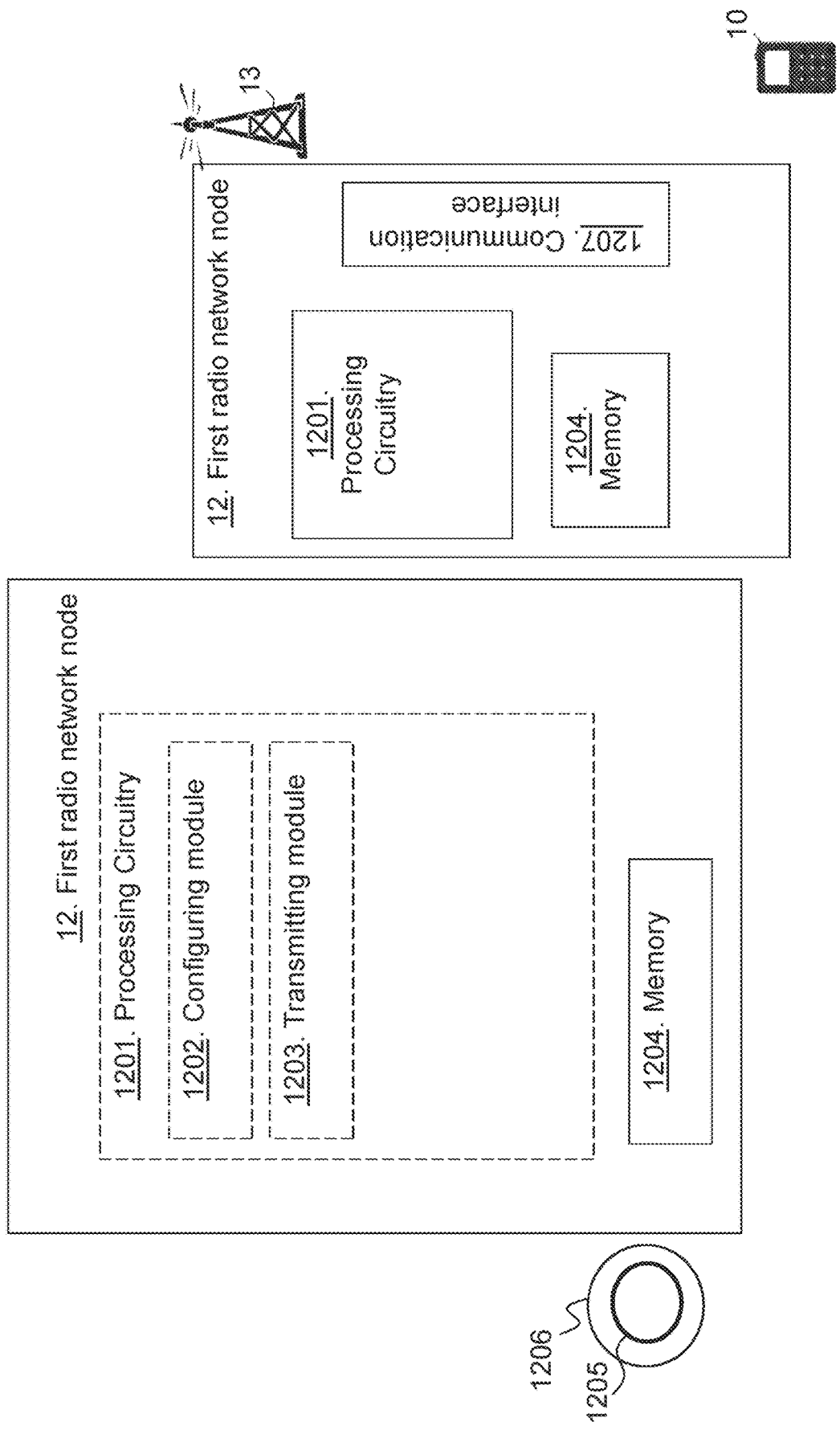
FIG. 14 is a block diagram depicting a first radio network node according to embodiments herein.

FIG. 14 is a block diagram depicting two embodiments of the radio network node such as the first radio network node 12 according to embodiments herein for handling or facilitating communication of the wireless device in the wireless communication network. The first radio network node 12 is configured to serve the wireless device 10.

The first radio network node 12 may comprise processing circuitry 1201, e.g. one or more processors, configured to perform the methods herein.

The first radio network node 12 may comprise a configuring module 1202, e.g. a transmitter or a transceiver. The first radio network node 12, the processing circuitry 1101, and/or the configuring module 1202 is configured to transmit configuration data to the wireless device 10. The configuration data comprises the first indication indicating the first number of beams for performing cell quality derivation on and the second indication indicating the second number of beams for performing measurement reporting on. The first and second numbers are different.

The first radio network node 12 may comprise a transmitting module 1203, e.g. a transmitter or a transceiver. The first radio network node 12, the processing circuitry 1101, and/or the transmitting module 1203 may be configured to transmit a handover command to the wireless device 10.

The first radio network node 12 further comprises a memory 1204. The memory comprises one or more units to be used to store data on, such as indications, thresholds, numbers of beams, strengths or qualities, parameters, applications to perform the methods disclosed herein when being executed, and similar.

The methods according to the embodiments described herein for the first radio network node 12 are respectively implemented by means of e.g. a computer program product 1205 e.g. a computer program, comprising instructions, i.e., software code portions, which, when executed on at least one processor, cause the at least one processor to carry out the actions described herein, as performed by the first radio network node 12. The computer program product 1205 may be stored on a computer-readable storage medium 1206, e.g. a disc, a USB stick, or similar. The computer-readable storage medium 1206, having stored thereon the computer program stick, may comprise the instructions which, when executed on at least one processor, cause the at least one processor to carry out the actions described herein, as performed by the first radio network node 12. In some embodiments, the computer-readable storage medium may be a non-transitory computer-readable storage medium.

Thus, the first radio network node 12 may comprise the processing circuitry and the memory, said memory comprising instructions executable by said processing circuitry whereby said radio network node is operative to perform the methods herein.

Figure 15:
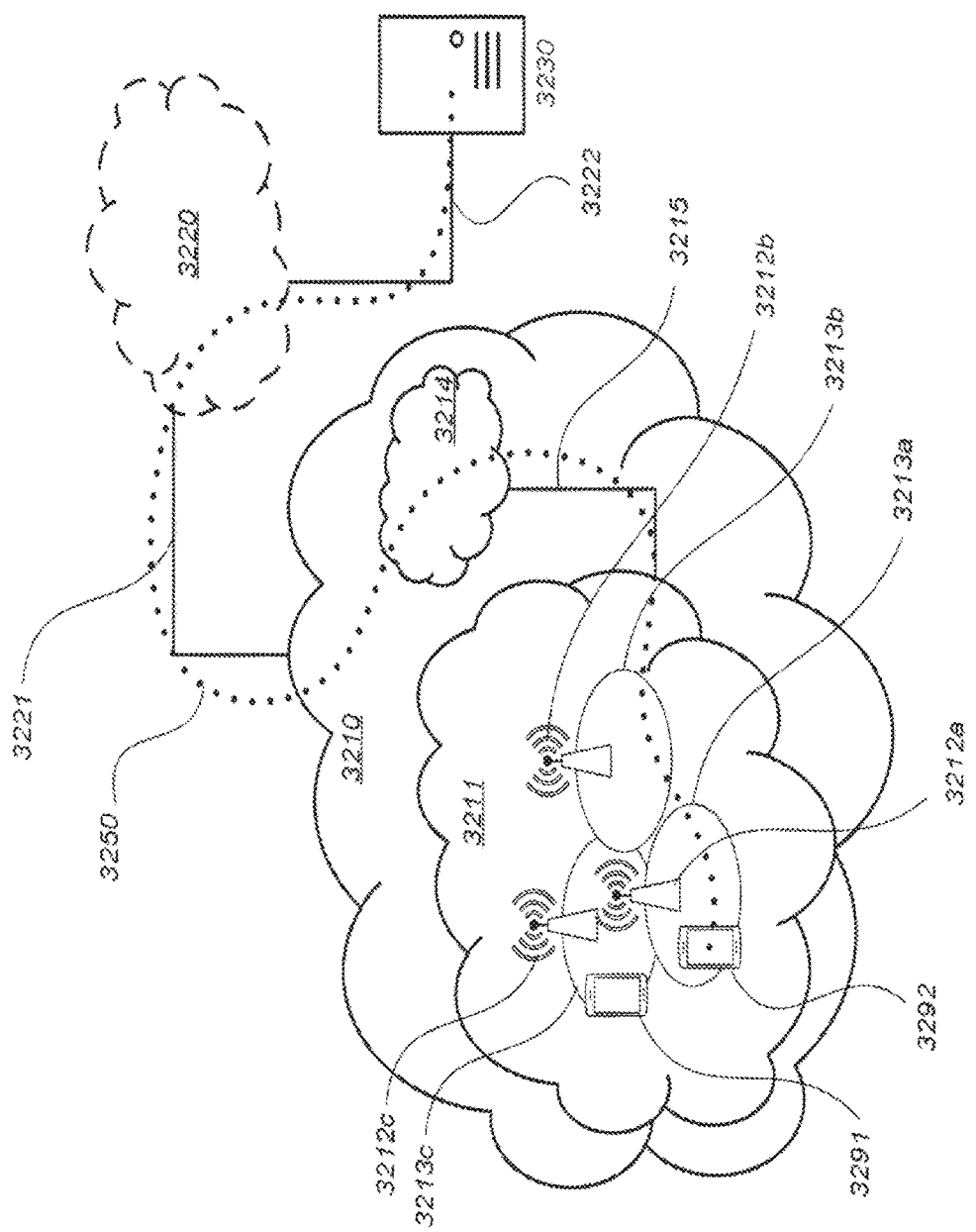

With reference to FIG. 15, in accordance with an embodiment, a communication system includes a telecommunication network 3210, such as a 3GPP-type cellular network, which comprises an access network 3211, such as a radio access network, and a core network 3214. The access network 3211 comprises a plurality of radio network nodes 3212a, 3212b, 3212c, such as NBs, eNBs, gNBs or other types of wireless access points, each defining a corresponding coverage area 3213a, 3213b, 3213c. Each radio network node 3212a, 3212b, 3212c is connectable to the core network 3214 over a wired or wireless connection 3215. The wireless device denoted as user equipment (UE) 3291 located in coverage area 3213c is configured to wirelessly connect to, or be paged by, the corresponding base station 3212c. A second wireless device denoted as UE 3292 in coverage area 3213a is wirelessly connectable to the corresponding radio network node 3212a. While a plurality of UEs 3291, 3292 are illustrated in this example, the disclosed embodiments are equally applicable to a situation where a sole UE is in the coverage area or where a sole UE is connecting to the corresponding radio network node 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 15 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a radio network node 3212 may not or need not be informed about the past routing of an incoming downlink communication with data originating from a host computer 3230 to be forwarded (e.g., handed over) to the connected UE 3291. Similarly, the radio network node 3212 need not be aware of the future routing of an outgoing uplink communication originating from the UE 3291 towards the host computer 3230.

Example implementations, in accordance with an embodiment, of the UE, radio network node and host computer discussed in the preceding paragraphs will now be described with reference to FIG. 16. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330, being an example of the wireless device 10, connecting via an OTT connection 3350 terminating at the UE 3330 and the host computer 3310. In providing the service to the remote user, the host application 3312 may provide user data which is transmitted using the OTT connection 3350.

The communication system 3300 further includes a radio network node 3320, being an example of the first radio network node 12, provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 16) served by the radio network node 3320. The communication interface 3326 may be configured to facilitate a connection 3360 to the host computer 3310. The connection 3360 may be direct or it may pass through a core network (not shown in FIG. 16) of the telecommunication system and/or through one or more intermediate networks outside the telecommunication system. In the embodiment shown, the hardware 3325 of the radio network node 3320 further includes processing circuitry 3328, which may comprise one or more programmable processors, application-specific integrated circuits, field programmable gate arrays or combinations of these (not shown) adapted to execute instructions. The radio network node 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a radio network node serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 16:
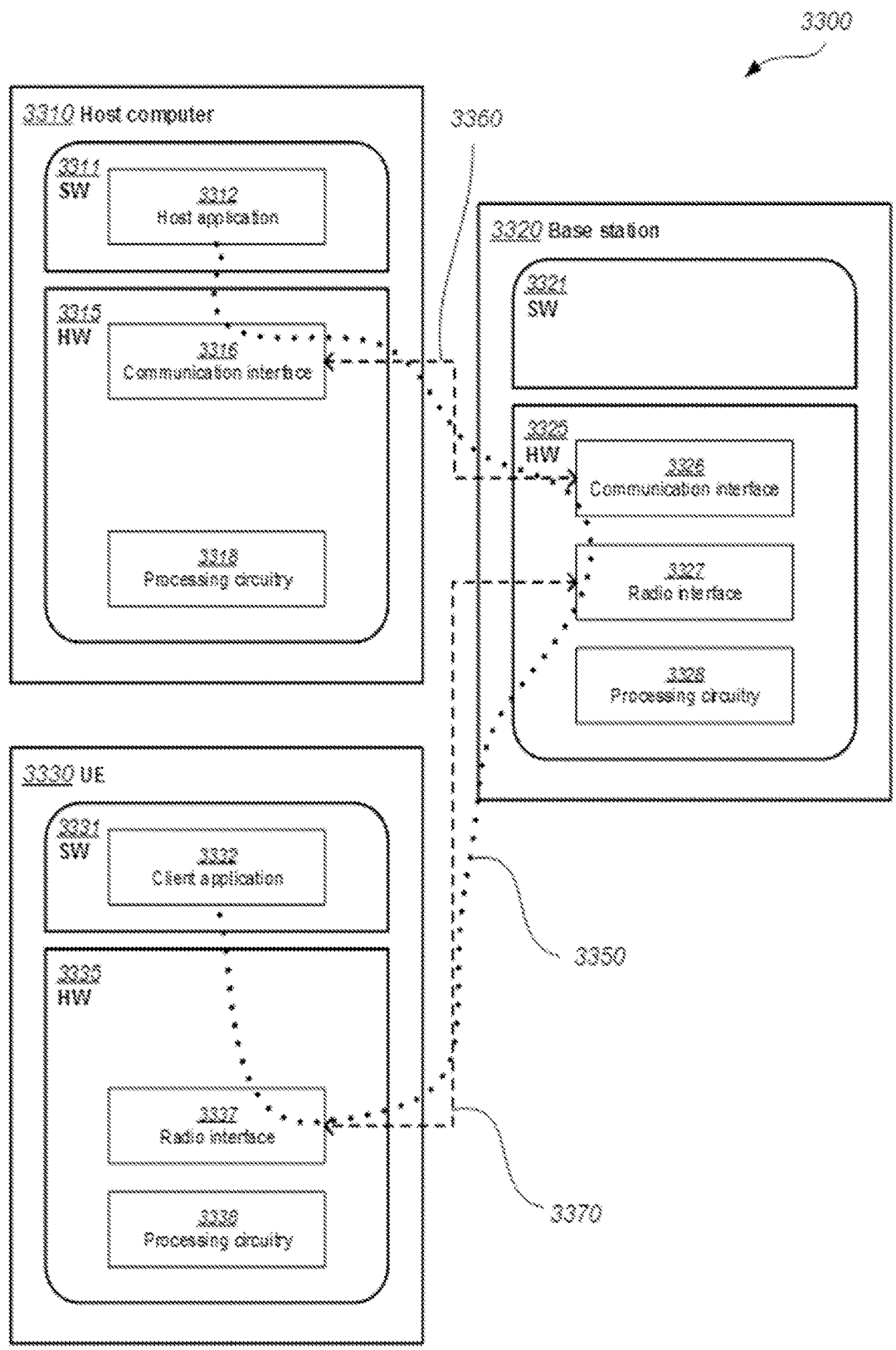

It is noted that the host computer 3310, radio network node 3320 and UE 3330 illustrated in FIG. 16 may be identical to the host computer 3230, one of the radio network nodes 3212a, 3212b, 3212c and one of the UEs 3291, 3292 of FIG. 15, respectively. This is to say, the inner workings of these entities may be as shown in FIG. 16 and independently, the surrounding network topology may be that of FIG. 15.

In FIG. 16, the OTT connection 3350 has been drawn abstractly to illustrate the communication between the host computer 3310 and the UE 3330 via the radio network node 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the radio network node 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the performance since ping-pong handovers and/or failed handovers are avoided and thereby provide benefits such as reduced user waiting time on the OTT service.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the radio network node 3320, and it may be unknown or imperceptible to the radio network node 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 17:
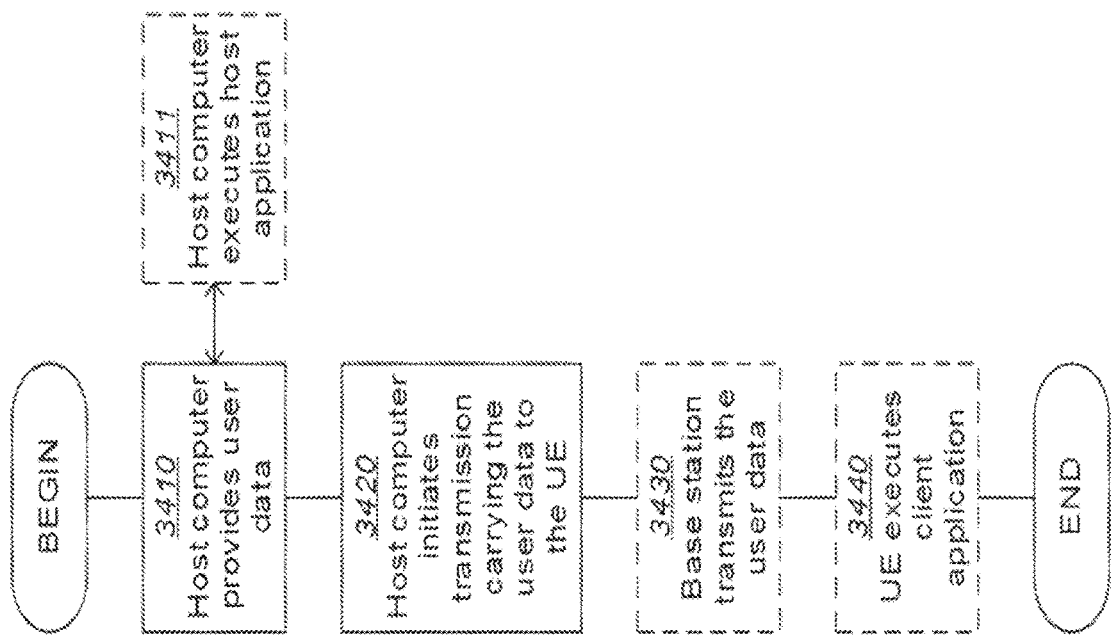

FIG. 17 is a flowchart illustrating a method implemented in a communication system, in accordance with one embodiment. The communication system includes a host computer, a radio network node and a wireless device, denoted as a UE, which may be those described with reference to FIGS. 15 and 16. For simplicity of the present disclosure, only drawing references to FIG. 17 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the radio network node transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 18:
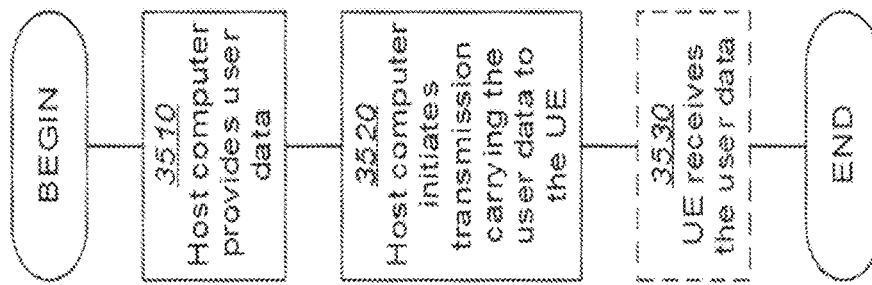

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the radio network node, in accordance with the teachings of the embodiments described throughout this disclosure. In an optional third step 3530, the UE receives the user data carried in the transmission.

Figure 19:
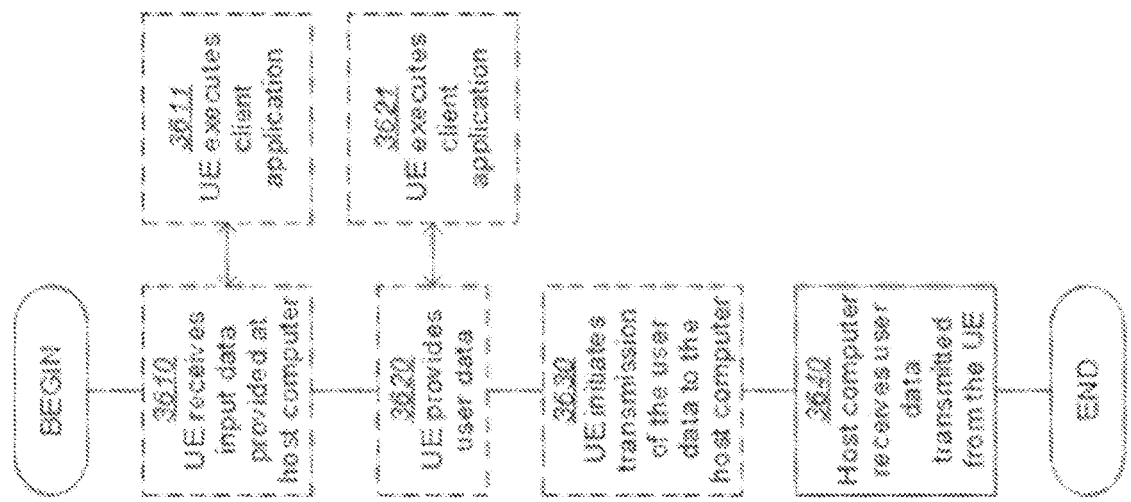

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 20:
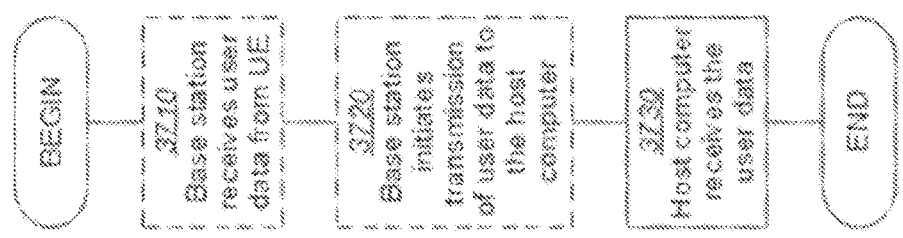

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In an optional first step 3710 of the method, in accordance with the teachings of the embodiments described throughout this disclosure, the radio network node receives user data from the UE. In an optional second step 3720, the radio network node initiates transmission of the received user data to the host computer. In a third step 3730, the host computer receives the user data carried in the transmission initiated by the radio network node.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc, Operation and Maintenance (O&M), Operation Support System (OSS), Self-Organizing Network (SON), positioning node e.g. Evolved Serving Mobile Location Centre (E-SMLC), Minimizing Drive Test (MDT) etc.

It should further be noted that a wireless communication network may be virtually network sliced into a number of Network/RAN slices, each Network/RAN slice supports one or more type of wireless devices and/or one or more type of services i.e. each network slice supports a different set of functionalities. Network slicing introduces the possibility that the network/RAN slices are used for different services and use cases and these services and use cases may introduce differences in the functionality supported in the different network slices. Each network/RAN slice may comprise one or more network nodes or elements of network nodes providing the services/functionalities for the respective network slice. Each network/RAN slice may comprise a network node such as a RAN node and/or a core network node.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the wireless device receives and/or transmit signals (e.g. data) e.g. LTE, LTE Frequency Division Duplex/Time Division Duplex (FDD/TDD), WCDMA/HSPA, GSM/GERAN, Wi Fi, WLAN, CDMA2000 etc.

Antenna node is a unit capable of producing one or more beams covering a specific service area or direction. An antenna node can be a base station, or a part of a base station.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

It is herein disclosed a method performed by a wireless device for handling communication of the wireless device in a wireless communication network. A first radio network node serves the wireless device. The wireless device performs a cell quality derivation on a first number of beams and perform measurement reporting of a second number of beams. The first and second numbers are different (decoupled). The wireless device may obtain a first indication indicating the first number of beams for performing cell quality derivation on and a second indication indicating the second number of beams for performing measurement reporting on. Upon receiving the two indications about number of beams the wireless device may select a maximum among these two indications to initiate the number of filters to perform per beam measurement. If the configured number of beams for cell quality derivation is higher than the number of beams for measurement reporting, the wireless device may set up the maximum number of filters, perform and measurements, use all values fulfilling the conditions for cell quality derivation while only a subset for measurement reporting. If the configured number of beams for cell quality derivation is lower than the number of beams for measurement reporting the wireless device may set up the maximum number of filters, perform and measurements, use a subset of values for cell quality derivation while includes all available filtered values in the measurement reports. The number of beams configured by the first radio network node to be used by the wireless device on these two different purposes are interpreted as the maximum number of beams to be used. If the wireless device detects a cell, initiates the maximum number of filters to perform beam level measurements and, after an evaluation period the wireless device detects a number of beams that is lower than any of the configured values, this should be used to derive the cell quality and to be included in the measurement reports.

It is herein disclosed a method performed by a first radio network node for handling communication of a wireless device in a wireless communication network. The first radio network node serves the wireless device. The first radio network node transmits configuration data i.e. configures the wireless device with data, which configuration data comprises a first indication indicating a first number of beams for performing cell quality derivation on and a second indication indicating a second number of beams for performing measurement reporting on. The first and second numbers are different.

Furthermore, a first radio network node and a wireless device configured to perform the methods herein are also provided.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a wireless device for handling communication of the wireless device in a wireless communication network, wherein a radio network node serves the wireless device, the method comprising:
   obtaining a first indication indicating a first number of beams for performing cell quality derivation on and a second indication indicating a second number of beams for performing measurement reporting on, wherein the first and second numbers are different and the first number is lower than the second number;
   performing a cell quality derivation taking the first indication into account; and
   performing measurement reporting of the second number of beams taking the second indication into account.

2. The method according to claim 1, wherein, obtaining the first indication comprises assuming the first indication to indicate that the first number of beam is one when no indication is received by the wireless device, or when only receiving the second indication from the radio network node.

3. The method according to claim 1, wherein the first and/or the second indication is a real value defining the number of beams and/or a threshold value defining best beams.

4. The method according to claim 1, wherein the first indication indicates that the first number of beams is one.

5. The method according to claim 1, comprising, if the first number of beams for cell quality derivation is lower than the second number of beams for measurement reporting, setting up a maximum number of filters, and performing cell quality derivation using a subset of values for cell quality derivation while including all available filtered values in the measurement reports.

6. The method according to claim 1, wherein numbers of beams configured by the radio network node to be used by the wireless device for cell quality derivation and measurement reporting are interpreted as the maximum number of beams to be averaged to compute cell quality derivation.

7. The method according to claim 1, wherein the first indication is a function using the second indication.

8. A method performed by a radio network node for handling communication of a wireless device in a wireless communication network, wherein the radio network node serves the wireless device, the method comprising:
   transmitting configuration data to the wireless device, wherein the configuration data comprises a first indication indicating a first number of beams for performing cell quality derivation on and a second indication indicating a second number of beams for performing measurement reporting on, wherein the first and second numbers are different and the first number is lower than the second number.

9. A wireless device for handling communication of the wireless device in a wireless communication network, wherein a radio network node is configured to serve the wireless device and the wireless device comprising processing circuitry configured to:
   obtain a first indication indicating a first number of beams for performing cell quality derivation on and a second indication indicating a second number of beams for performing measurement reporting on, wherein the first and second numbers are different and the first number is lower than the second number;
   perform a cell quality derivation taking the first indication into account; and to
   perform a measurement reporting of the second number of beams taking the second indication into account.

10. The wireless device according to claim 9, wherein the wireless device is configured to obtain the first indication by assuming the first indication to indicate that the first number of beam is one when no indication is received by the wireless device, or when only receiving the second indication from the radio network node.

11. The wireless device according to claim 9, wherein the first and/or the second indication is a real value defining the number of beams and/or a threshold value defining best beams.

12. The wireless device according to claim 9, wherein the first indication indicates that the first number of beams is one.

13. The wireless device according to claim 9, further being configured to, when the first number of beams for cell quality derivation is lower than the second number of beams for measurement reporting, set up a maximum number of filters, and to perform the cell quality derivation using a subset of values for cell quality derivation while including all available filtered values in the measurement reports.

14. The wireless device according to claim 9, configured to interpret the numbers of beams configured by the radio network node to be used by the wireless device for cell quality derivation and measurement reporting as the maximum number of beams to be averaged to compute cell quality derivation.

15. The wireless device according to claim 9, wherein the first indication is a function using the second indication.

16. A radio network node for handling communication of a wireless device in a wireless communication network, wherein the radio network node comprising processing circuitry configured to serve the wireless device, and to:
   transmit configuration data to the wireless device, wherein the configuration data comprises a first indication indicating a first number of beams for performing cell quality derivation on and a second indication indicating a second number of beams for performing measurement reporting on, wherein the first and second numbers are different and the first number is lower than the second number.

17. A wireless device comprising processing circuitry configured to:
obtain a first indication indicating a first number of beams for performing cell quality derivation on and a second indication indicating a second number of beams for performing measurement reporting on, wherein the first and second numbers are different and the first number is lower than the second number;
perform a cell quality derivation taking the first indication into account; and to perform a measurement reporting of the second number of beams taking the second indication into account.

18. A radio network node comprising processing circuitry configured to:
transmit configuration data to the wireless device, wherein the configuration data comprises a first indication indicating a first number of beams for performing cell quality derivation on and a second indication indicating a second number of beams for performing measurement reporting on, wherein the first and second numbers are different and the first number is lower than the second number.

* * * * *

UNITED STATES PATENT AND TRADEMARK OFFICE
CERTIFICATE OF CORRECTION

| | | |
|---|---|---|
| PATENT NO. | : 11,051,191 B2 | Page 1 of 1 |
| APPLICATION NO. | : 16/606913 | |
| DATED | : June 29, 2021 | |
| INVENTOR(S) | : Da Silva et al. | |

It is certified that error appears in the above-identified patent and that said Letters Patent is hereby corrected as shown below:

On the Title Page

In Item (57), under "ABSTRACT", in Column 2, Line 1, delete "performed a" and insert -- performed by a --, therefor.

In the Specification

In Column 7, Line 63, delete "performed a" and insert -- performed by a --, therefor.

In Column 8, Line 8, delete "performed a" and insert -- performed by a --, therefor.

In Column 10, Line 15, delete "device" and insert -- device 10 --, therefor.

In Column 10, Line 50, delete "device" and insert -- device 10 --, therefor.

In Column 10, Line 55, delete "LTE," and insert -- LTE, Wi-Fi --, therefor.

In Column 16, Line 66, delete "the fed" and insert -- then fed --, therefor.

In Column 17, Line 13, delete "the fed" and insert -- then fed --, therefor.

In Column 24, Line 5, delete "equipped" and insert -- equipment --, therefor.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*